(12) United States Patent
Shahana

(10) Patent No.: US 11,130,548 B2
(45) Date of Patent: Sep. 28, 2021

(54) HUMAN-POWERED VEHICLE CONTROL DEVICE

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 429 days.

(21) Appl. No.: 16/163,951

(22) Filed: Oct. 18, 2018

(65) Prior Publication Data

US 2019/0127020 A1 May 2, 2019

(30) Foreign Application Priority Data

Oct. 27, 2017 (JP) .............................. JP2017-208497

(51) Int. Cl.
*B62M 6/50* (2010.01)
*B62M 9/04* (2006.01)

(52) U.S. Cl.
CPC ................ *B62M 6/50* (2013.01); *B62M 9/04* (2013.01)

(58) Field of Classification Search
CPC .................................. B62M 6/50; B62M 9/04
See application file for complete search history.

(56) References Cited

U.S. PATENT DOCUMENTS

| | | | | |
|---|---|---|---|---|
| 7,350,787 B2 * | 4/2008 | Voss | .................. | B60L 50/20 280/5.5 |
| 8,286,982 B2 * | 10/2012 | Plantet | ................. | B62K 25/08 280/277 |
| 8,825,322 B1 * | 9/2014 | Ikemoto | ................ | B62M 25/08 701/60 |
| 9,199,690 B2 * | 12/2015 | Watarai | .................. | B62J 99/00 |
| 2009/0088934 A1 * | 4/2009 | Takebayashi | .......... | B62M 25/08 701/51 |
| 2013/0311019 A1 | 11/2013 | Tanaka et al. | | |
| 2015/0130153 A1 | 5/2015 | Chen et al. | | |
| 2015/0345925 A1 | 12/2015 | Smit et al. | | |
| 2016/0046339 A1 | 2/2016 | Chen et al. | | |

FOREIGN PATENT DOCUMENTS

| | | | | |
|---|---|---|---|---|
| CN | 1111486 C | 6/2003 | | |
| CN | 103430446 A | 12/2013 | | |
| JP | 7-33070 A | 2/1995 | | |
| JP | 8-127382 A | 5/1996 | | |
| JP | 9-123978 A | 5/1997 | | |
| JP | 10-194185 A | 7/1998 | | |
| JP | 2011-201373 A | 10/2011 | | |
| JP | 2011201373 | * 10/2011 | .............. | B62M 6/45 |
| JP | 5450194 B2 | 1/2014 | | |
| JP | 2015-93671 A | 5/2015 | | |

* cited by examiner

*Primary Examiner* — Tony H Winner
(74) *Attorney, Agent, or Firm* — Global IP Counselors, LLP

(57) ABSTRACT

A human-powered vehicle control device includes an electronic controller operatively coupled to a motor that assists in propulsion of a human-powered vehicle. The electronic controller is configured to changes at least one of a ratio of output of the motor to a human driving force that is input to the human-powered vehicle or an upper limit value of an output torque of the motor in accordance with the human driving force inputted to the human-powered vehicle upon determining a transmission ratio of the human-powered vehicle is in a predetermined range.

21 Claims, 14 Drawing Sheets

HUMAN-POWERED VEHICLE CONTROL DEVICE

CROSS-REFERENCE TO RELATED APPLICATIONS

This application claims priority to Japanese Patent Application No. 2017-208497, filed on Oct. 27, 2017. The entire disclosure of Japanese Patent Application No. 2017-208497 is hereby incorporated herein by reference.

BACKGROUND

Field of the Invention

The present invention generally relates to a human-powered vehicle control device.

Background Information

Japanese Laid-Open Patent Publication No. 9-123978 (Patent document 1) describes one example of a known human-powered vehicle control device. The human-powered vehicle control device has a motor assist propulsion of a human-powered vehicle in accordance with human driving force input to the human-powered vehicle. The human-powered vehicle control device also changes the transmission ratio of the human-powered vehicle in accordance with human driving force input to the human-powered vehicle.

SUMMARY

The human-powered vehicle control device described in the above mentioned in Patent document 1 changes the transmission ratio in a case in which human driving force input to the human-powered vehicle increases. However, no consideration is made to appropriate control of the motor in a case in which human driving force input to the human-powered vehicle increases. One object of the present disclosure is to provide a human-powered vehicle control device having a motor appropriately assist propulsion of a human-powered vehicle.

A first aspect of the present disclosure is a human-powered vehicle control device that includes an electronic controller operatively coupled to a motor that assists in propulsion of a human-powered vehicle. The electronic controller is configured to change at least one of a ratio of an output of the motor to a human driving force that is input to the human-powered vehicle or an upper limit value of an output torque of the motor in accordance with the human driving force inputted to the human-powered vehicle upon determining a transmission ratio of the human-powered vehicle is in a predetermined range. In accordance with the first aspect, upon determining the transmission of the human-powered vehicle is in the predetermined range, the at least one of the ratio of output of the motor and the upper limit value of an output torque of the motor is changed in accordance with human driving force. Thus, the motor appropriately assists propulsion of the human-powered vehicle. The at least one of the ratio of output of the motor and the upper limit value of an output torque of the motor includes only the ratio, only the upper limit value, or both the ratio and the upper limit value.

In accordance with a second aspect of the present disclosure, the human-powered vehicle control device according to the first aspect is configured so that the predetermined range includes a first range. The electronic controller is configured to increase the at least one of the ratio and the upper limit value upon determining the transmission ratio is in a first range of the predetermined range and the human driving force is greater than or equal to a first predetermined value. In accordance with the second aspect, upon determining the human driving force is greater than or equal to the first predetermined value, the at least one of the ratio and the upper limit value is increased. Thus, the rider can easily continue to propel the human-powered vehicle without decreasing the transmission ratio.

In accordance with a third aspect of the present disclosure, the human-powered vehicle control device according to the first aspect is configured so that the electronic controller is configured to decrease the at least one of the ratio and the upper limit value upon determining the transmission ratio is in a second range of the predetermined range and the human driving force is less than or equal to a second predetermined value. In accordance with the third aspect, upon determining the human driving force is less than or equal to the second predetermined value, the at least one of the ratio and the upper limit value is decreased. Thus, power consumption is reduced.

In accordance with a fourth aspect of the present disclosure, the human-powered vehicle control device according to the first aspect is configured so that the electronic controller is configured to increase the at least one of the ratio and the upper limit value upon determining the transmission ratio is in a first range of the predetermined range and the human driving force is greater than or equal to a first predetermined value. Also, the electronic controller is configured to decrease the at least one of the ratio and the upper limit value upon determining the transmission ratio is in a second range of the predetermined range and the human driving force is less than or equal to a second predetermined value, the transmission ratio of the second range is greater than the transmission ratio of the first range. Thus, the rider can easily continue to propel the human-powered vehicle without decreasing the transmission ratio. Additionally, upon determining the transmission ratio is relatively high and included in the second range and the human driving force is less than or equal to the second predetermined value, the at least one of the ratio and the upper limit value is decreased. Thus, power consumption is reduced.

In accordance with a fifth aspect of the present disclosure, the human-powered vehicle control device according to the second or fourth aspect is configured so that the electronic controller is configured to decrease the at least one of the ratio and the upper limit value upon determining the transmission ratio has been changed to a transmission ratio that is outside the first range after the at least one of the ratio and the upper limit value has been previously increased due to the transmission ratio being in the first range and the human driving force being greater than or equal to the first predetermined value. In accordance with the fifth aspect, upon determining the transmission ratio has changed after the at least one of the ratio and the upper limit value is increased, the at least one of the ratio and the upper limit value is changed to the value that was set before the increase or a value close to the value that was set before the increase.

In accordance with a sixth aspect of the present disclosure, the human-powered vehicle control device according to the second or fourth aspect is configured so that the electronic controller is configured to decrease the at least one of the ratio and the upper limit value upon determining the human driving force has been changed to less than the first predetermined value after the at least one of the ratio and the upper limit value has been previously increased due to the transmission ratio being in the first range and the human driving force being greater than or equal to the first predetermined value. In accordance with the sixth aspect, upon determining the human driving force is decreased after the at least one of the ratio and the upper limit value is increased, the at least one of the ratio and the upper limit value is changed to the value that was set before the increase or a value close to the value that was set before the increase.

In accordance with a seventh aspect of the present disclosure, the human-powered vehicle control device according to the third or fourth aspect is configured so that the electronic controller is configured to increase the at least one of the ratio and the upper limit value upon determining the transmission ratio has been changed to a transmission ratio outside the second range after the at least one of the ratio and the upper limit value has been previously decreased due to the transmission ratio being in the second range and the human driving force being less than or equal to the second predetermined value. In accordance with the seventh aspect, upon determining the transmission ratio has changed after the at least one of the ratio and the upper limit value is decreased, the at least one of the ratio and the upper limit value is changed to or closer to the value that was set before the decrease.

In accordance with an eighth aspect of the present disclosure, the human-powered vehicle control device according to the third or fourth aspect is configured so that the electronic controller is configured to increase the at least one of the ratio and the upper limit value upon determining the human driving force has been changed to greater than the second predetermined value after the at least one of the ratio and the upper limit value is decreased due to the transmission ratio being in the second range and the human driving force being less than or equal to the second predetermined value. In accordance with the eighth aspect, upon determining the human driving force has increased after the at least one of the ratio and the upper limit value has decreased, the at least one of the ratio and the upper limit value is changed to or closer to the value that was set before the decrease.

In accordance with a ninth aspect of the present disclosure, the human-powered vehicle control device according to any one of the first to eighth aspects is configured so that the electronic controller is configured to use an input torque that is input to a crank arm of the human-powered vehicle as the human driving force upon determining the crank arm is located at a predetermined rotational angle. In accordance with the ninth aspect, the input torque obtained upon determining the crank arm is located at the predetermined rotational angle is used as the human driving force. Thus, calculation loads are reduced.

In accordance with a tenth aspect of the present disclosure, the human-powered vehicle control device according to any one of the first to eighth aspects is configured so that the electronic controller is configured to use an average torque or power that is input to a crank arm of the human-powered vehicle as the human driving force. In accordance with the tenth aspect, the average torque or power input to the crank arm is used as the human driving force. Thus, the motor is stably controlled.

An eleventh aspect of the present disclosure is a human-powered vehicle control device that includes a controller operatively coupled to a motor that assists in propulsion of a human-powered vehicle. The electronic controller is configured to change at least one of a ratio of output of the motor to a human driving force that is input to the human-powered vehicle or an upper limit value of an output torque of the motor in accordance with input information that is input from a sensor provided at the human-powered vehicle upon determining a transmission ratio of the human-powered vehicle is in a predetermined range. In accordance with the eleventh aspect, upon determining the transmission ratio is in the predetermined range, at least one of the ratio of output of the motor and the upper limit value of an output torque of the motor is changed in accordance with information input from the sensor. Thus, the motor appropriately assists propulsion of the human-powered vehicle.

A twelfth aspect of the present disclosure is a human-powered vehicle control device that includes a controller operatively coupled to a motor that assists in propulsion of a human-powered vehicle. The electronic controller being configured to change at least one of a ratio of output of the motor to a human driving force that is input to the human-powered vehicle or an upper limit value of an output torque of the motor in accordance with a rider's pedaling posture of a rider of the human-powered vehicle upon determining a transmission ratio of the human-powered vehicle is in a predetermined range. In accordance with the twelfth aspect, upon determining the transmission ratio is in the predetermined range, the at least one of the ratio of output of the motor and the upper limit value of an output torque of the motor is changed in accordance with the rider's pedaling posture. Thus, the motor appropriately assists propulsion of the human-powered vehicle.

In accordance with a thirteenth aspect of the present disclosure, the human-powered vehicle control device according to the twelfth aspect is configured so that the electronic controller is configured to increase the at least one of the ratio and the upper limit value upon determining the transmission ratio is in a first range of the predetermined range and the rider's pedaling posture has changed from sitting to standing. In accordance with the thirteenth aspect, upon determining the rider's pedaling posture has changed from sitting to standing, the motor appropriately assists propulsion of the human-powered vehicle.

In accordance with a fourteenth aspect of the present disclosure, the human-powered vehicle control device according to the thirteenth aspect is configured so that the electronic controller is configured to decrease at least one of the ratio and the upper limit value upon determining the transmission ratio is in a second range of the predetermined range and the rider's pedaling posture has changed from standing to sitting. In accordance with the fourteenth aspect, upon determining the rider's pedaling posture has changed from standing to sitting, the motor appropriately assists propulsion of the human-powered vehicle.

In accordance with a fifteenth aspect of the present disclosure, the human-powered vehicle control device according to any one of the twelfth to fourteenth aspects further includes a rider's pedaling posture sensor operatively coupled to the electronic controller. In accordance with the fifteenth aspect, the rider's pedaling posture of the rider is appropriately detected with the sensor.

In accordance with a sixteenth aspect of the present disclosure, the human-powered vehicle control device according to the eleventh or fifteenth aspect is configured so that the sensor includes at least one of a crank force sensor, a pedal force sensor, a frame force sensor, a saddle force sensor, a seatpost force sensor, a handlebar force sensor, a vehicle mounted camera, a roll direction inclination sensor, or a roll direction acceleration sensor. In accordance with the sixteenth aspect, the rider's pedaling posture can be appropriately detected with various kinds of sensors.

In accordance with a seventeenth aspect of the present disclosure, the human-powered vehicle control device according to the sixteenth aspect is configured so that the electronic controller is configured to increase the at least one of the ratio and the upper limit value upon determining a force applied to at least one of the saddle or the seatpost is changed from a value greater than or equal to a third predetermined value to a value less than the third predetermined value. In accordance with the seventeenth aspect, upon determining force applied to the at least one of the saddle and the seatpost is decreased, the rider can easily continue to propel the human-powered vehicle without decreasing the transmission ratio. The at least one of the saddle and the seatpost includes only the saddle, only the seatpost, or both the saddle and the seatpost.

In accordance with an eighteenth aspect of the present disclosure, the human-powered vehicle control device according to the seventeenth aspect is configured so that the electronic controller is configured to decrease the at least one of the ratio and the upper limit value upon determining a force applied to at least one of the saddle or the seatpost is changed from a value less than a fourth predetermined value to a value greater than or equal to the fourth predetermined value. In accordance with the eighteenth aspect, upon determining force applied to the at least one of the saddle and the seatpost is increased, power consumption is reduced.

In accordance with a nineteenth aspect of the present disclosure, the human-powered vehicle control device according to the eighteenth aspect is configured so that the third predetermined value differs from the fourth predetermined value. In accordance with the nineteenth aspect, the third predetermined value differs from the fourth predetermined value. Thus, even upon determining force applied to the at least one of the saddle and the seatpost varies in the proximity of the third predetermined value or the fourth predetermined value, the electronic controller does not frequently execute the process for changing the at least one of the ratio and the upper limit value.

In accordance with a twentieth aspect of the present disclosure, the human-powered vehicle control device according to any one of the first to nineteenth aspects is configured so that the electronic controller is configured to change the transmission ratio in accordance with the human driving force upon determining the transmission ratio is outside the predetermined range. In accordance with the twentieth aspect, upon determining the transmission ratio is outside the predetermined range, the transmission ratio is changed in accordance with the human driving force. This allows the rider to efficiently drive the human-powered vehicle.

In accordance with a twenty-first aspect of the present disclosure, the human-powered vehicle control device according to any one of the first to twentieth aspects further includes a human driving force detector operatively coupled to the electronic controller. In accordance with the twenty-first aspect, the human driving force is appropriately detected with the detector.

The human-powered vehicle control device of the present disclosure has the motor appropriately assist propulsion of the human-powered vehicle.

BRIEF DESCRIPTION OF THE DRAWINGS

Referring now to the attached drawings which form a part of this original disclosure.

DETAILED DESCRIPTION OF EMBODIMENTS

Figure 1:
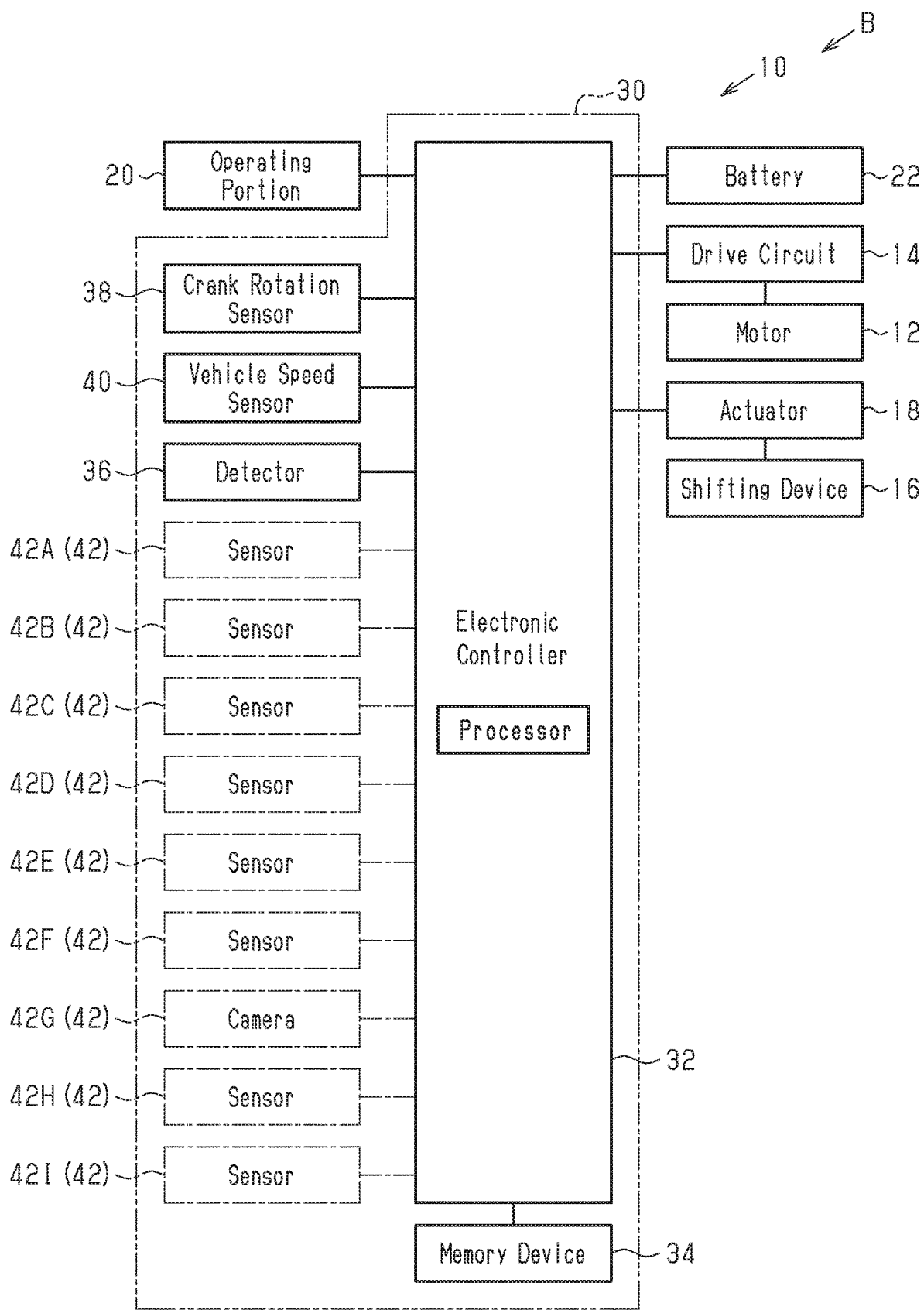
FIG. 1 is a block diagram showing an electrical configuration of a human-powered vehicle control system of a human-powered vehicle control device in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

One embodiment of a human-powered vehicle control device 30 will now be described with reference to FIG. 1.

The human-powered vehicle control device 30 is provided on a human-powered vehicle B. The human-powered vehicle B is a vehicle configured to be driven by at least human driving force. The human-powered vehicle B includes, for example, a bicycle. The number of wheels in the human-powered vehicle B is not limited. The human-powered vehicle B includes, for example, a unicycle and a vehicle with three or more wheels. The bicycle includes, for example, a mountain bike, a road bike, a city bike, a cargo bike, and a recumbent bike. In the embodiments described below, the human-powered vehicle B refers to a bicycle.

The human-powered vehicle B includes a frame, a crank, and a drive wheel. Human driving force is input to the crank. The crank includes a crankshaft rotatably supported by the frame and a pair of crank arms provided on two opposite ends of the crankshaft. Each of the crank arms is coupled to a pedal. The drive wheel is supported by the frame. The crank and the drive wheel are coupled by a drive mechanism. The drive mechanism includes a first rotary body coupled to the crankshaft. The crankshaft and the first rotary body can be coupled via a first one-way clutch. The first one-way clutch is configured to allow for forward rotation of the first rotary body in a case in which the crank rotates forward and restrict rearward rotation of the first rotary body in a case in which the crank rotates rearward. The first rotary body includes a sprocket, a pulley, or a bevel gear. The drive mechanism further includes a coupling member and a second rotary body. The coupling member transmits rotational force of the first rotary body to the second rotary body. The coupling member includes, for example, a chain, a belt, or a shaft.

The second rotary body is coupled to the drive wheel. The second rotary body includes a sprocket, a pulley, or a bevel gear. It is preferred that a second one-way clutch be provided between the second rotary body and the drive wheel. The second one-way clutch is configured to allow forward rotation of the drive wheel in a case in which the second rotary body rotates forward and restrict rearward rotation of the drive wheel in a case in which the second rotary body rotates rearward.

The human-powered vehicle B includes a front wheel and a rear wheel. In the following description of the embodiments, the rear wheel refers to the drive wheel. However, the front wheel can be the drive wheel.

A human-powered vehicle control system 10 includes a motor 12, a drive circuit 14 of the motor 12, a shifting device 16, an actuator 18 of the shifting device 16, an operating portion 20, a battery 22 and the human-powered vehicle control device 30.

It is preferred that the motor 12 and the drive circuit 14 be provided in the same housing (not shown). The drive circuit 14 controls electric power supplied from the battery 22 to the motor 12. The drive circuit 14 is connected to perform wired or wireless communication with an electronic controller 32 of the human-powered vehicle control device 30. The electronic controller 32 will hereafter be referred to simply as the controller 32. The drive circuit 14 is configured to communicate with the electronic controller 32, for example, through serial communication. The drive circuit 14 drives the motor 12 in accordance with a control signal from the controller 32. The motor 12 assists propulsion of the human-powered vehicle B. The motor 12 includes an electric motor. The motor 12 is provided to transmit rotation to the front wheel or a transmission path of human driving force extending from the pedals to the rear wheel. The motor 12 is provided on the frame of the human-powered vehicle B, the rear wheel, or the front wheel. In one example, the motor 12 is coupled to the power transmission path between the crankshaft and the front rotary body. It is preferred that a one-way clutch be provided in the power transmission path between the motor 12 and the crankshaft so that in a case in which the crankshaft rotates in a direction moving the human-powered vehicle B forward, the rotational force of the crank will not rotate the motor 12. Components other than the motor 12 and the drive circuit 14 can be provided in the housing in which the motor 12 and the drive circuit 14 are provided. For example, a speed reduction unit can be provided to reduce speed of rotation of the motor 12 and output the rotation.

The shifting device 16 is configured to change a transmission ratio R of the human-powered vehicle B. The transmission ratio R of the human-powered vehicle B is a ratio of the rotational speed of the drive wheel to the rotational speed of the crank of the human-powered vehicle B. The shifting device 16 is configured to change the transmission ratio R in a stepped manner. The actuator 18 has the shifting device 16 perform a shifting operation. The shifting device 16 is controlled by the controller 32. The actuator 18 is connected to perform wired or wireless communication with the controller 32. The actuator 18 is configured to communicate with the controller 32, for example, through power line communication (PLC). The actuator 18 has the shifting device 16 perform the shifting operation in accordance with a control signal from the controller 32. In one example, the shifting device 16 changes the speed of rotation input from the crank and transmits the rotation to the rear wheel. In this case, the shifting device 16 includes an internal shifting device. The internal shifting device can include a continuously variable transmission (CVT) mechanism. The internal shifting device is provided near the crankshaft or in a hub of the rear wheel. The internal shifting device can be provided in the power transmission path between the crank and the first rotary body. In another example, the shifting device 16 changes the speed of rotation input to the crankshaft and transmits the rotation to the rear wheel by moving the chain between a plurality of front sprockets or a plurality of rear sprockets. In this case, the shifting device 16 includes an external shifting device (derailleur). The external shifting device includes at least one of a front external shifting device moving the chain between the plurality of front sprockets and a rear external shifting device moving the chain between the plurality of rear sprockets. The actuator 18 includes an electric motor. As the actuator 18 is driven, the shifting device 16 performs the shifting operation to change the transmission ratio of the human-powered vehicle B in a stepped manner.

The operating portion 20 is operable by the user. The operating portion 20 is configured to change a control mode of the motor 12 assisting propulsion of the human-powered vehicle B. The control mode includes an assist mode in which the motor 12 is driven in accordance with human driving force input to the human-powered vehicle B. It is preferred that the assist mode include multiple assist modes differing from each other in the strength of force assisting human driving force. The control mode can further include an off mode in which the motor 12 is not driven, a walk mode in which the motor 12 is driven in accordance with operation of the operating portion 20, or both the off mode and the walk mode. The operating portion 20 is coupled to a handlebar of the human-powered vehicle B. The operating portion 20 includes, for example, an operating member, a sensor detecting movement of the operating member, and an electrical circuit communicating with the controller 32 in accordance with an output signal from the sensor. The operating portion 20 is connected to perform wired or wireless communication with the controller 32. The operating portion 20 is configured to communicate with the controller 32, for example, through PLC. As the user operates the operating portion 20, the operating portion 20 transmits an output signal to the controller 32. The operating portion 20 includes one or more operating members for changing the control mode of the motor 12. Each operating member includes a push switch, a lever-type switch, or a touchscreen. The operating portion 20 can include an operating member for driving the motor 12 in the walk mode.

The battery 22 includes one or more battery cells. Each battery cell includes a rechargeable battery. The battery 22 is provided on the human-powered vehicle B to supply electric power to other electric components, for example, the motor 12, the actuator 18, and the human-powered vehicle control device 30, which are electrically connected to the battery 22 by wires. The battery 22 is connected to perform wired or wireless communication with the controller 32. The battery 22 is configured to communicate with the controller 32, for example, through PLC. The battery 22 can be attached to the exterior of the frame or can be at least partially accommodated in the frame.

The human-powered vehicle control device 30 includes the controller 32. In one example, the human-powered vehicle control device 30 further includes a memory device 34, a detector 36 and a vehicle speed sensor 40.

The detector 36 detects human driving force TA. The detector 36 outputs a signal corresponding to the human driving force TA. The detector 36 detects the human driving force TA that is input to the crank via the pedals. The detector 36 can be provided in a transmission path of the human driving force TA between the crankshaft and the front rotary body or on one of the crankshaft, the front rotary body, the crank arms, and the pedals. The detector 36 can be realized by, for example, a strain sensor, an optical sensor, or a pressure sensor. The strain sensor includes a strain gauge, a magnetostriction sensor, and a piezoelectric sensor. Any sensor outputting a signal corresponding to the human driving force TA applied to the crank arms or the pedals can be used as the detector 36. The detector 36 is connected to perform wired or wireless communication with the controller 32. The detector 36 outputs a signal corresponding to the human driving force TA to the controller 32.

A crank rotation sensor 38 detects a rotational angle of the crank. The crank rotation sensor 38 is attached to the frame of the human-powered vehicle B or the housing in which the motor 12 is provided. The crank rotation sensor 38 is configured to include a magnetic sensor outputting a signal corresponding to strength of a magnetic field. An annular magnet having a magnetic field strength that varies in the circumferential direction is provided on the crankshaft or in the power transmission path between the crankshaft and the front rotary body. Use of the magnetic sensor outputting a signal corresponding to the magnetic field strength allows for detection of rotational speed of the crank and rotational angle of the crank with the single sensor. Thus, the configuration and assembly are simplified. The crank rotation sensor 38 is configured to detect the rotational speed of the crank in addition to the rotational angle of the crank. The crank rotation sensor 38 is connected to perform wired or wireless communication with the controller 32. The crank rotation sensor 38 outputs a signal corresponding to the rotational angle of the crank to the controller 32. The crank rotation sensor 38 can be configured to detect only the rotational speed of the crank.

The vehicle speed sensor 40 detects rotational speed of a wheel. The vehicle speed sensor 40 is electrically connected to the controller 32 through wired or wireless communication. The vehicle speed sensor 40 is attached to a chainstay of the frame. The vehicle speed sensor 40 is connected to perform wired or wireless communication with the controller 32. The vehicle speed sensor 40 outputs a signal corresponding to a change in the relative position between the vehicle speed sensor 40 and a magnet attached to the rear wheel to the controller 32. The controller 32 calculates a vehicle speed V of the human-powered vehicle B based on the rotational speed of the wheel. It is preferred that the vehicle speed sensor 40 include a magnetic reed forming a reed switch or a Hall element. The vehicle speed sensor 40 can be provided on a front fork and configured to detect a magnet attached to the front wheel.

The controller 32 includes an arithmetic processing unit executing predetermined control programs. The arithmetic processing unit includes, for example, a central processing unit (CPU) or a micro processing unit (MPU) that includes one or more processors. The controller 32 can include one or more microcomputers. The controller 32 can be formed of one or more semiconductor chips that are mounted on a printed circuit board. The term "electronic controller" or "controller" as used herein refers to hardware that executes a software program. The memory device 34 stores information used in various control programs and various control processes. The memory device 34 is any computer storage device or any computer readable medium with the sole exception of a transitory, propagating signal. The memory device 34 includes, for example, a nonvolatile memory and a volatile memory. The controller 32 and the memory device 34 are provided, for example, at the housing in which the motor 12 is provided.

The controller 32 controls the motor 12. The controller 32 controls the motor 12 so that the ratio of output of the motor 12 to the human driving force TA that is input to the human-powered vehicle B equals a ratio A. The human driving force TA is an input torque that is input to the crank arms. The output of the motor 12 is an output torque TM of the motor 12. The controller 32 is configured to control the motor 12 in a plurality of assist modes corresponding to different ratios A at least at some vehicle speeds V. Upon determining the assist mode includes, for example, three operating modes, namely, a first mode, a second mode, and a third mode, the ratio A includes a first ratio A1, a second ratio A2 that is smaller than the first ratio A1, and a third ratio A3 that is smaller than the second ratio A2. In the first mode, the ratio A is the first ratio A1. In the second mode, the ratio A is the second ratio A2. In the third mode, the ratio A is the third ratio A3. The assist mode can include two assist modes or four or more assist modes. Upon determining the crank is not rotating, the controller 32 stops the driving of the motor 12 regardless of the detection result of the detector 36. Upon determining the vehicle speed is higher than or equal to a predetermined speed, the controller 32 stops the driving of the motor 12 regardless of the detection result of the detector 36. The predetermined speed is, for example, 25 km/h or 45 km/h.

The controller 32 changes the ratio A in accordance with a signal from the operating portion 20. The controller 32 changes the ratio A by changing the assist mode in accordance with a signal from the operating portion 20.

The controller 32 changes the ratio A in accordance with the human driving force TA. The memory device 34 stores information specifying the relationship between the human driving force TA and the ratio A. The information specifying the relationship between the human driving force TA and the ratio A includes a map, a table, a relational expression, or any combination of the map, the table, and the relational expression. The controller 32 changes the ratio A in accordance with the information specifying the relationship between the human driving force TA and the ratio A stored in the memory device 34. The memory device 34 stores information specifying the relationship between the human driving force TA and the ratio A corresponding to each assist mode.

Figure 2:
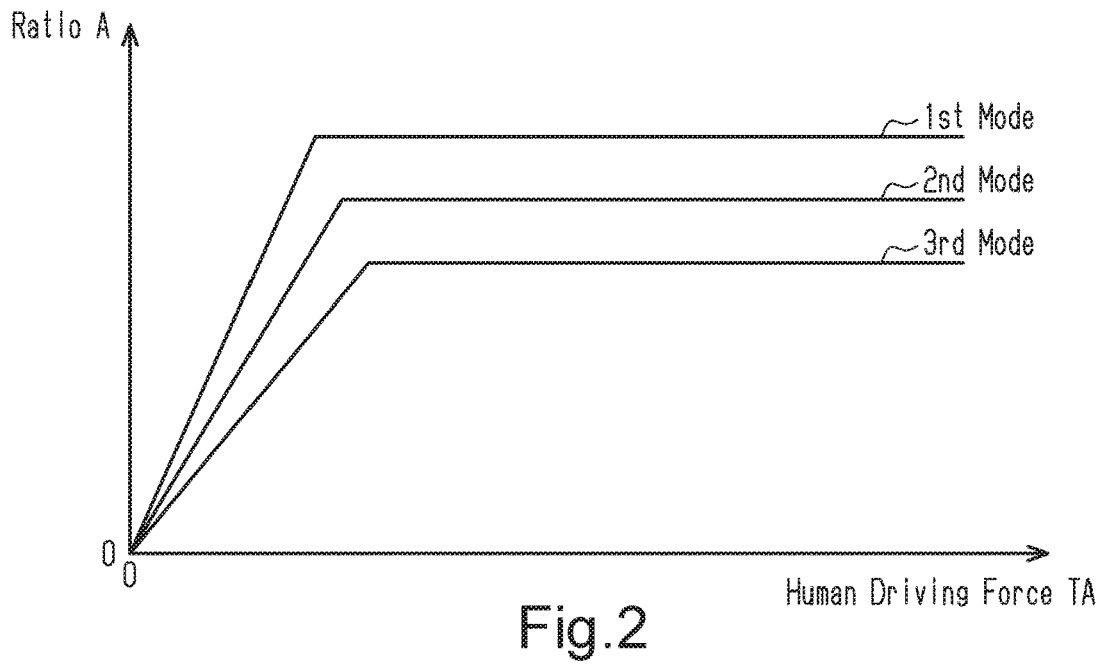
FIG. 2 is a prestored control map showing one example of a relationship between a human driving force and a ratio stored in a memory device of the human-powered vehicle control device shown in FIG. 1.

FIG. 2 shows one example of a map specifying the relationship between the human driving force TA and the ratio A stored in the memory device 34. As shown in FIG. 2, in each assist mode, the ratio A is specified to be increased as the human driving force TA increases and be fixed when the human driving force TA reaches a predetermined value. The memory device 34 can store information specifying the relationship between the ratio A and the amount of rotation of the crank from a point in time at which the motor 12 starts to be driven or time elapsed from a point in time at which the motor 12 starts to be driven instead of the human driving force TA. The relationship between the ratio A and the amount of rotation of the crank from a point in time at which the motor 12 starts to be driven and the relationship between the ratio A and the time elapsed from a point in time at which the motor 12 starts to be driven are the same as the relationship between the human driving force TA and the ratio A shown on the map in FIG. 2.

The human driving force TA includes an input torque that is input to the crank arms of the human-powered vehicle B in a case in which the crank arms are located at a predetermined rotational angle. In one example, the predetermined rotational angle of the crank arms is an angle intermediate between top dead center and bottom dead center of the crank. The intermediate angle of top dead center and bottom dead center of the crank includes an angle at which the human driving force TA is maximal in one rotation of the crank.

The controller 32 executes controls differing between a case in which the transmission ratio R is in a predetermined range W and a case in which the transmission ratio R is outside the predetermined range W. The predetermined range W includes a first range W1. The predetermined range W includes a second range W2. The second range W2 includes a greater transmission ratio R than the first range W1. In one example, the first range W1 includes the minimum one of the transmission ratios R, and the second range W2 includes the maximum one of the transmission ratios R. The predetermined range W does not include at least one of the transmission ratios R that can be set by the shifting device 16 excluding the minimum transmission ratio R and the maximum transmission ratio R. The first range W1 can include only the minimum transmission ratio R of the transmission ratios R. For example, the first range W1 can include only one of the transmission ratios R that is obtained in a case in which the chain engages with one of the plurality of rear sprockets having the largest diameter. The second range W2 can include only the maximum transmission ratio R of the transmission ratios R. For example, the second range W2 can include only one of the transmission ratios R that is obtained in a case in which the chain engages with one of the plurality of rear sprockets having the smallest diameter. The first range W1 does not have to include the minimum transmission ratio R of the transmission ratios R. The second range W2 does not have to include the maximum transmission ratio R of the transmission ratios R. The memory device 34 stores information related to the first range W1 and the second range W2. The first range W1, the second range W2, or both the first range W1 and the second range W2 can be stored in the memory device 34 and configured to be changed by an external device. The external device includes, for example, a personal computer, a tablet computer, a smartphone, and a cycle computer.

Upon determining the transmission ratio R is outside the predetermined range W, the controller 32 changes the transmission ratio R in accordance with the human driving force TA. More specifically, upon determining the transmission ratio R is outside the predetermined range W and the human driving force TA is greater than or equal to a fifth predetermined value TAX, the controller 32 actuates the shifting device 16 to decrease the transmission ratio R. Upon determining the transmission ratio R is outside the predetermined range W and the human driving force TA is less than or equal to a sixth predetermined value TAY, the controller 32 actuates the shifting device 16 to increase the transmission ratio R. Upon determining the transmission ratio R is outside the predetermined range W, the controller 32 can be configured to actuate the shifting device 16 in accordance with operation of the operating portion 20 instead of changing the transmission ratio R in accordance with the human driving force TA.

Upon determining the transmission ratio R of the human-powered vehicle B is in the predetermined range W, the controller 32 changes the ratio A of output of the motor 12 to the human driving force TA input to the human-powered vehicle B in accordance with the human driving force TA.

Upon determining the transmission ratio R is in the first range W1 and the human driving force TA is greater than or equal to a first predetermined value TA1, the controller 32 increases the ratio A. After the ratio A is increased in a case in which the transmission ratio R is in the first range W1 and the human driving force TA is greater than or equal to the first predetermined value TA1, if the human driving force TA has changed to less the first predetermined value TA1, the controller 32 decreases the ratio A. In one example, the controller 32 increases the ratio A by changing the assist mode to increase the ratio A by one step. In one example, the controller 32 decreases the ratio A by changing the assist mode to decrease the ratio A by one step. After the assist mode has changed to increase the ratio A by one step in a case in which the transmission ratio R is in the first range W1 and the human driving force TA is greater than or equal to the first predetermined value TA1, if the human driving force TA has changed to less than the first predetermined value TA1, the controller 32 changes the assist mode back so that the ratio A is decreased by one step. The first predetermined value TA1 can be, for example, a value corresponding to the human driving force TA applied by the rider standing and pedaling the human-powered vehicle B uphill in a state in which the transmission ratio R is in the first range W1. It is preferred that the first predetermined value TA1 be greater than the fifth predetermined value TAX.

Upon determining the transmission ratio R is in the second range W2 and the human driving force TA is less than or equal to a second predetermined value TA2, the controller 32 decreases the ratio A. After the ratio A is decreased in a case in which the transmission ratio R is in the second range W2 and the human driving force TA is less than or equal to the second predetermined value TA2, if the human driving force TA has changed to greater than the second predetermined value TA2, the controller 32 increases the ratio A. In one example, the controller 32 decreases the ratio A by changing the assist mode to decrease the ratio A by one step. In one example, the controller 32 increases the ratio A by changing the assist mode to increase the ratio A by one step. After the assist mode has changed to decrease the ratio A by one step in a case in which the transmission ratio R is in the second range W2 and the human driving force TA is less than or equal to the second predetermined value TA2, if the human driving force TA has changed to greater than the second predetermined value TA2, the controller 32 changes the assist mode back so that the ratio A is increased by one step. The second predetermined value TA2 can be, for example, a value corresponding to the human driving force TA applied by the rider sitting and pedaling the human-powered vehicle B on a downhill or level road in a state in which the transmission ratio R is in the second range W2. It is preferred that the second predetermined value TA2 be less than the sixth predetermined value TAY.

Figure 3:
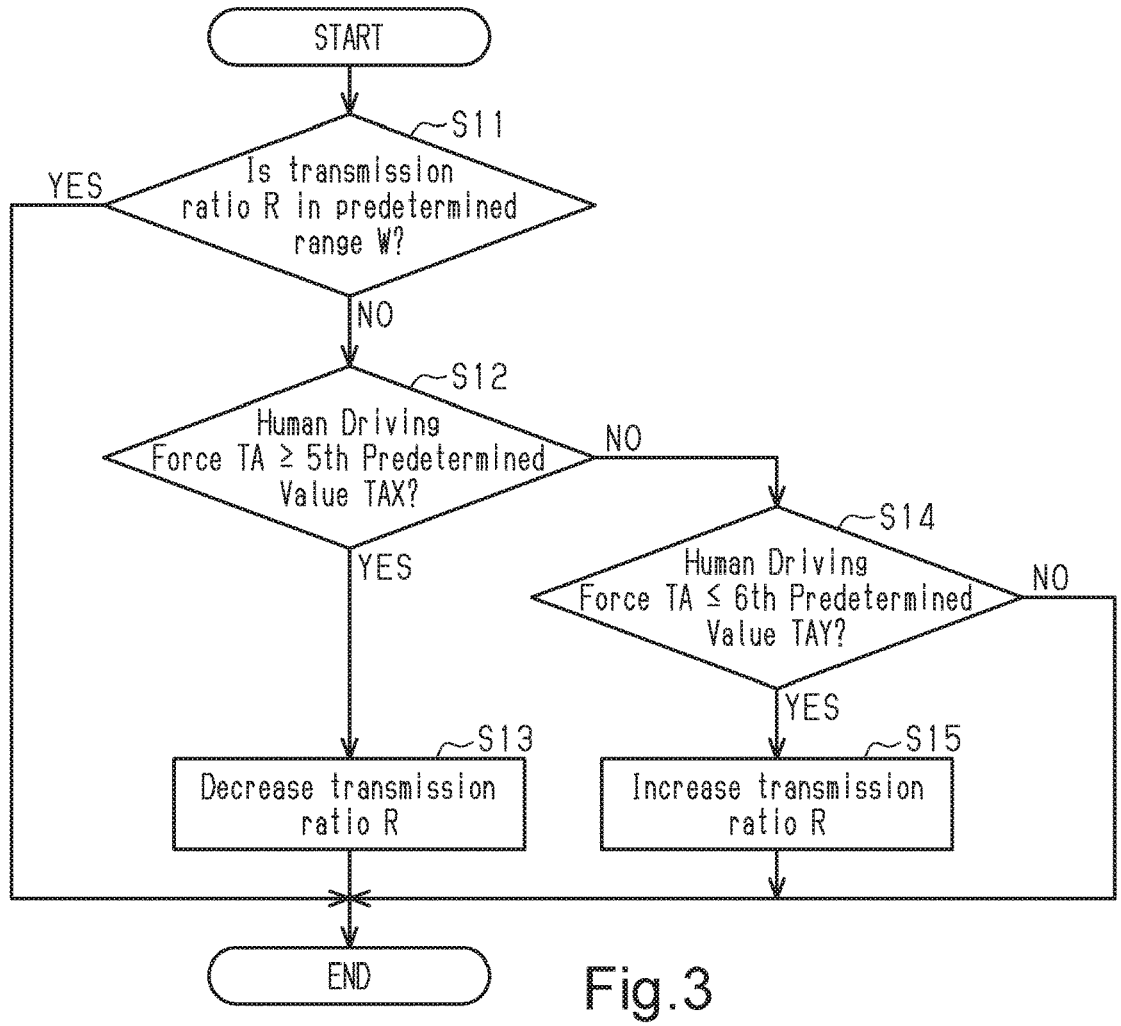
FIG. 3 is a flowchart of a control process for changing a transmission ratio executed by the electronic controller shown in FIG. 1.

The process for changing the transmission ratio R will now be described with reference to FIG. 3. In a case in which the controller 32 is supplied with electric power from the battery 22, the controller 32 starts the process and proceeds to step S11 in the flowchart shown in FIG. 3. As long as the electric power is supplied, the controller 32 executes the process from step S11 in a predetermined cycle. The controller 32 can be configured to switch between an automatic shifting mode in which the transmission ratio R is changeable and a manual shifting mode in which the transmission ratio R is changed only by operation of a shift operating portion. In this case, if the automatic shifting mode is set, the controller 32 starts the process and proceeds to step S11 in the flowchart shown in FIG. 3. As long as the automatic shifting mode is set, the controller 32 executes the process from step S11 in a predetermined cycle.

In step S11, the controller 32 determines whether or not the transmission ratio R is in the predetermined range W. In a case in which the controller 32 determines that the transmission ratio R is in the predetermined range W, the controller 32 ends the process. In a case in which the controller 32 determines that the transmission ratio R is outside the predetermined range W, the controller 32 proceeds to step S12.

In step S12, the controller 32 determines whether or not the human driving force TA is greater than or equal to the fifth predetermined value TAX. In a case in which the controller 32 determines that the human driving force TA is greater than or equal to the fifth predetermined value TAX, the controller 32 proceeds to step S13. In step S13, the controller 32 decreases the transmission ratio R and ends the process. More specifically, the controller 32 has the shifting device 16 perform a shifting operation to decrease the transmission ratio R by one step.

In a case in which the controller 32 determines in step S12 that the human driving force TA is less than the fifth predetermined value TAX, the controller 32 proceeds to step S14. In step S14, the controller 32 determines whether or not the human driving force TA is less than or equal to the sixth predetermined value TAY. In a case in which the controller 32 determines that the human driving force TA is greater than the sixth predetermined value TAY, the controller 32 ends the process.

In a case in which the controller 32 determines in step S14 that the human driving force TA is less than or equal to the sixth predetermined value TAY, the controller 32 proceeds to step S15. In step S15, the controller 32 increases the transmission ratio R and ends the process. More specifically, the controller 32 has the shifting device 16 perform a shifting operation to increase the transmission ratio R by one step.

The process for changing the ratio A will now be described with reference to FIG. 4. Upon determining the operating portion 20 is operated and the assist mode is set, the controller 32 starts the process and proceeds to step S21 in the flowchart in FIG. 4. As long as the assist mode is set, the controller 32 executes the process from step S21 in a predetermined cycle.

In step S21, the controller 32 determines whether or not the transmission ratio R is in the first range W1. In a case in which the controller 32 determines that the transmission ratio R is in the first range W1, the controller 32 proceeds to step S22. In step S22, the controller 32 determines whether or not the human driving force TA is greater than or equal to the first predetermined value TA1. In a case in which the controller 32 determines that the human driving force TA is less than the first predetermined value TA1, the controller 32 ends the process. In a case in which the controller 32 determines that the human driving force TA is greater than or equal to the first predetermined value TA1, the controller 32 proceeds to step S22A.

In step S22A, the controller 32 determines whether or not the present assist mode is the assist mode corresponding to the highest ratio A. In a case in which the controller 32 determines that the present assist mode is the assist mode corresponding to the highest ratio A, the controller 32 ends the process. In a case in which the controller 32 determines that the present assist mode is not the assist mode corresponding to the highest ratio A, the controller 32 proceeds to step S23. In step S23, the controller 32 increases the ratio A and proceeds to step S24.

In step S24, the controller 32 determines whether or not the human driving force TA is less than the first predetermined value TA1. Upon determining the human driving force TA is greater than or equal to the first predetermined value TA1, the controller 32 again performs the determination process of step S24. Upon determining the human driving force TA is less than the first predetermined value TA1, the controller 32 proceeds to step S25. In step S25, the controller 32 decreases the ratio A and ends the process.

In a case in which the controller 32 determines in step S21 that the transmission ratio R is outside the first range W1, the controller 32 proceeds to step S26. In step S26, the controller 32 determines whether or not the transmission ratio R is in the second range W2. In a case in which the controller 32 determines that the transmission ratio R is in the second range W2, the controller 32 proceeds to step S27. In step S27, the controller 32 determines whether or not the human driving force TA is less than or equal to the second predetermined value TA2. In a case in which the controller 32 determines that the human driving force TA is greater than the second predetermined value TA2, the controller 32 ends the process. In a case in which the controller 32 determines that the human driving force TA is less than or equal to the second predetermined value TA2, the controller 32 proceeds to step S27A.

In step S27A, the controller 32 determines whether or not the present assist mode is the assist mode corresponding to the lowest ratio A. In a case in which the controller 32 determines that the present assist mode is the assist mode corresponding to the lowest ratio A, the controller 32 ends the process. In a case in which the controller 32 does not determine that the present assist mode is the assist mode corresponding to the lowest ratio A, the controller 32 proceeds to step S28. In step S28, the controller 32 decreases the ratio A and proceeds to step S29.

In step S29, the controller 32 determines whether or not the human driving force TA is greater than the second predetermined value TA2. Upon determining the human driving force TA is less than or equal to the second predetermined value TA2, the controller 32 again performs the determination process of step S29. Upon determining the human driving force TA is greater than the second predetermined value TA2, the controller 32 proceeds to step S30. The controller 32 increases the ratio A in step S30 and ends the process.

In a case in which the controller 32 determines in step S26 that the transmission ratio R is outside the second range W2, the controller 32 ends the process.

Second Embodiment

A second embodiment of the human-powered vehicle control device 30 will not be described with reference to FIGS. 1 and 5. The human-powered vehicle control device 30 of the second embodiment is the same as the human-powered vehicle control device 30 of the first embodiment except that the process shown in FIG. 5 for changing the ratio A is executed instead of the process shown in FIG. 4 for changing the ratio A. Same reference characters are given to those elements that are the same as the corresponding elements of the first embodiment. Such elements will not be described in detail.

Upon determining the transmission ratio R is in the first range W1 and the human driving force TA is greater than or equal to the first predetermined value TA1, the controller 32 increases the ratio A. After the ratio A is increased in a case in which the transmission ratio R is in the first range W1 and the human driving force TA is greater than or equal to the first predetermined value TA1, if the transmission ratio R has changed to a transmission ratio R outside the first range W1, the controller 32 decreases the ratio A. In one example, the controller 32 increases the ratio A by changing the assist mode to increase the ratio A by one step. In one example, the controller 32 decreases the ratio A by changing the assist mode to decrease the ratio A by one step. After the assist mode has changed to increase the ratio A by one step in a case in which the transmission ratio R is in the first range W1 and the human driving force TA is greater than or equal to the first predetermined value TA1, if the transmission ratio R has changed to a transmission ratio R outside the first range W1, the controller 32 changes the assist mode back so that the ratio A is decreased by one step.

Upon determining the transmission ratio R is in the second range W2 and the human driving force TA is less than or equal to the second predetermined value TA2, the controller 32 decreases at least one of the ratio A and an upper limit value TMX. After the ratio A is decreased in a case in which the transmission ratio R is in the second range W2 and the human driving force TA is less than or equal to the second predetermined value TA2, if the transmission ratio R has changed to a transmission ratio R outside the second range W2, the controller 32 increases the ratio A. After the assist mode has changed to decrease the ratio A by one step in a case in which the transmission ratio R is in the second range W2 and the human driving force TA is less than or equal to the second predetermined value TA2, if the transmission ratio R has changed to a transmission ratio R outside the second range W2, the controller 32 changes the assist mode back so that the ratio A is increased by one step.

The process for changing the ratio A will now be described with reference to FIG. 5. The controller 32 executes the process shown in FIG. 5 in the same manner as the process shown in FIG. 4 except that step S31 of FIG. 5 is executed instead of step S24 of FIG. 4 and step S32 of FIG. 5 is executed instead of step S29 of FIG. 4.

In a case in which the controller 32 increases the ratio A in step S23, the controller 32 proceeds to step S31. In step S31, the controller 32 determines whether or not the transmission ratio R has changed to a transmission ratio R outside the first range W1. Upon determining the transmission ratio R is in the first range W1, the controller 32 again performs the determination process of step S31. Upon determining the transmission ratio R is outside the first range W1, the controller 32 proceeds to step S25. The controller 32 decreases the ratio A in step S25 and ends the process. For example, upon determining the transmission ratio R is greater than the transmission ratio R that is included in the first range W1, the controller 32 proceeds to step S25.

In a case in which the controller 32 decreases the ratio A in step S28, the controller 32 proceeds to step S32. In step S32, the controller 32 determines whether or not the transmission ratio R has changed to a transmission ratio R outside the second range W2. Upon determining the transmission ratio R is in the second range W2, the controller 32 again performs the determination process of step S32. Upon determining the transmission ratio R is outside the second range W2, the controller 32 proceeds to step S30. The controller 32 increases the ratio A in step S30 and ends the process. For example, upon determining the transmission ratio R is less than the transmission ratio R that is included in the second range W2, the controller 32 proceeds to step S30.

Third Embodiment

A third embodiment of the human-powered vehicle control device 30 will now be described with reference to FIGS. 1 and 6. The human-powered vehicle control device 30 of the third embodiment is the same as the human-powered vehicle control device 30 of the first embodiment except that the process shown in FIG. 6 for changing the ratio A is executed instead of the process shown in FIG. 4 for changing the ratio A. Same reference characters are given to those elements that are the same as the corresponding elements of the first embodiment. Such elements will not be described in detail.

As indicated by the single-dashed lines in FIG. 1, the human-powered vehicle control device 30 further includes a sensor 42 detecting the rider's pedaling posture of the rider and can be considered a rider's pedaling posture sensor. The sensor 42 includes at least one of sensors 42A, 42B, 42C, 42D, 42E, 42F, 42H and 42I, and a camera 42G. The sensor 42 can include only one of sensors 42A, 42B, 42C, 42D, 42E, 42F, 42H, and 42I, and a camera 42G or any combination the sensors 42A, 42B, 42C, 42D, 42E, 42F, 42H, and 42I, and a camera 42G.

The sensor 42A is a crank force sensor that detects force applied to the crank of the human-powered vehicle B. The sensor 42A can be included in the detector 36 or can be separate from the detector 36. The sensor 42A outputs a signal corresponding to force applied to the crank. In a case in which the rider pedals in a standing posture, the force applied to the crank is greater than in a case in which the rider pedals in a sitting posture. The controller 32 determines the rider's pedaling posture based on the amount of force applied to the crank detected by the sensor 42A. The sensor 42A and the detector 36 have the same configuration. The controller 32 can be configured to determine that the rider is standing and pedaling, for example, in a case in which the amount of force applied to the crank and the rotational angle of the crank satisfy a predetermined relationship. The controller 32 can be configured to determine that the rider is standing and pedaling in a case in which the amount of force applied to the crank is greater than or equal to a predetermined value.

The sensor 42B is a pedal force sensor that detects force applied to the pedals. The sensor 42B includes, for example, a pedal force meter or a power meter provided on the pedals. The sensor 42B outputs a signal corresponding to force applied to the pedals. In a case in which the rider pedals in a standing posture, the force applied to the pedals is greater than in a case in which the rider pedals in a sitting posture. The controller 32 determines the rider's pedaling posture based on the amount of force applied to the pedals detected by the sensor 42B. The controller 32 can be configured to determine that the rider is standing and pedaling, for example, in a case in which the amount of force applied to the pedals and the rotational angle of the crank satisfy a predetermined relationship. The controller 32 can be configured to determine that the rider is standing and pedaling in a case in which the amount of force applied to the pedals is greater than or equal to a predetermined value.

The sensor 42C is a frame force sensor that detects force applied to the frame. The sensor 42C is provided, for example, on the frame to detect strain of the frame. The sensor 42C outputs a signal corresponding to force applied to the frame. In a case in which the rider pedals in a standing posture, the strain of the frame is greater than in a case in which the rider pedals in a sitting posture. The controller 32 determines the rider's pedaling posture based on the amount of strain of the frame detected by the sensor 42C. The sensor 42C includes, for example, a strain sensor. The controller 32 determines that the rider is standing and pedaling, for example, in a case in which the amount of strain of the frame is greater than or equal to a predetermined value.

The sensor 42D is a saddle force sensor that detects force applied to a saddle. The sensor 42D is provided, for example, on the saddle to detect the load of the rider applied to the saddle. The sensor 42D outputs a signal corresponding to force applied to the saddle. In a case in which the rider pedals in a standing posture, the force applied to the saddle is smaller than in a case in which the rider pedals in a sitting posture. The controller 32 determines the rider's pedaling posture based on the amount of force applied to the saddle detected by the sensor 42D. The sensor 42D includes, for example, a pressure sensor. The controller 32 determines that the rider is standing and pedaling, for example, in a case in which the load of the rider applied to the saddle is less than a predetermined value.

The sensor 42E is a seatpost force sensor that detects force applied to a seatpost. The sensor 42E is provided, for example, on the seatpost to detect the load of the rider applied to the seatpost. The sensor 42E outputs a signal corresponding to force applied to the seatpost. In a case in which the rider pedals in a standing posture, the force applied to the seatpost is smaller than in a case in which the rider pedals in a sitting posture. The controller 32 determines the rider's pedaling posture based on the amount of force applied to the seatpost detected by the sensor 42E. The sensor 42E includes, for example, a strain sensor. The controller 32 determines that the rider is standing and pedaling, for example, in a case in which the load on the seatpost is less than a predetermined value.

The sensor 42F is a handlebar force sensor that detects force applied to the handlebar. The sensor 42F is provided, for example, on the handlebar to detect the load of the rider applied to the handlebar. The sensor 42F outputs a signal corresponding to force applied to the handlebar. In a case in which the rider pedals in a standing posture, the force applied to the handlebar is greater than in a case in which the rider pedals in a sitting posture. The controller 32 determines the rider's pedaling posture based on the amount of force applied to the handlebar detected by the sensor 42F. The sensor 42F includes, for example, a strain sensor. The controller 32 determines that the rider is standing and pedaling, for example, in a case in which the load on the handlebar is greater than or equal to a predetermined value.

The camera 42G is mounted on the human-powered vehicle B. The camera 42G is provided, for example, on the handlebar to capture an image at the rear of the handlebar. The camera 42G outputs an image of the rider. The controller 32 determines the rider's pedaling posture based on image data of the rider obtained by the camera 42G. The controller 32 compares, for example, the image data of the rider with predetermined image data and determines that the rider is standing and pedaling in a case in which the degree of similarity is higher than or equal to a predetermined value.

The sensor 42H detects an inclination of the human-powered vehicle B in a roll direction. The sensor 42H includes, for example, an inclination sensor. The inclination sensor includes, for example, at least one of a gyro sensor and an acceleration sensor. The inclination sensor can include only the gyro sensor, only the acceleration sensor or both the gyro sensor and the acceleration sensor. The sensor 42H is provided, for example, on the frame to detect an inclination of the frame in the roll direction. The sensor 36H constitutes a roll direction inclination sensor. The sensor 42H outputs a signal corresponding to the inclination of the human-powered vehicle B in the roll direction. In a case in which the rider pedals in a standing posture, a moved amount of the frame in the roll direction is greater than in a case in which the rider pedals in a sitting posture. The controller 32 determines the rider's pedaling posture based on the inclination of the human-powered vehicle B in the roll direction detected by the sensor 42H. The controller 32 determines that the rider is standing and pedaling, for example, in a case in which the inclination of the frame in the roll direction repeatedly changes between being greater than or equal to a predetermined value and being less than the predetermined value.

The sensor 42I detects acceleration of the human-powered vehicle B in the roll direction. The sensor 42I includes, for example, an acceleration sensor. The sensor 42I is provided, for example, on the frame to detect acceleration of the frame in the roll direction. The sensor 36I constitutes a roll direction acceleration sensor. The sensor 42I outputs a signal corresponding to the acceleration of the human-powered vehicle B in the roll direction. In a case in which the rider pedals in a standing posture, the acceleration of the frame in the roll direction is greater than in a case in which the rider pedals in a sitting posture. The controller 32 determines the rider's pedaling posture based on the acceleration of the human-powered vehicle B in the roll direction detected by the sensor 42I. The controller 32 determines that the rider is standing and pedaling, for example, in a case in which the acceleration of the frame in the roll direction repeatedly changes between being greater than or equal to a predetermined value and being less than the predetermined value.

Upon determining the transmission ratio R of the human-powered vehicle B is in the predetermined range W, the controller 32 changes the ratio A in accordance with the rider's pedaling posture of the rider of the human-powered vehicle B. Upon determining the transmission ratio R is in the first range W1 and the rider's pedaling posture has changed from sitting to standing, the controller 32 increases the ratio A. After the assist mode has changed to increase the ratio A by one step in a case in which the transmission ratio R is in the first range W1 and the rider's pedaling posture has changed from sitting to standing, if the rider's pedaling posture has changed from standing to sitting, the controller 32 changes the assist mode back so that the ratio A is decreased by one step.

Upon determining the transmission ratio R is in the second range W2 and the rider's pedaling posture has changed from standing to sitting, the controller 32 decreases the ratio A. After the assist mode has changed to decrease the ratio A by one step in a case in which the transmission ratio R is in the second range W2 and the rider's pedaling posture has changed from standing to sitting, if the rider's pedaling posture has changed from sitting to standing, the controller 32 changes the assist mode back so that the ratio A is increased by one step.

The process for changing the ratio A will now be described with reference to FIG. 6. Upon determining the operating portion 20 is operated and the assist mode is set, the controller 32 starts the process and proceeds to step S41 in the flowchart of FIG. 6. As long as the assist mode is set, the controller 32 executes the process from step S41 in a predetermined cycle.

In step S41, the controller 32 determines whether or not the transmission ratio R is in the first range W1. In a case in which the controller 32 determines that the transmission ratio R is in the first range W1, the controller 32 proceeds to step S42. In step S42, the controller 32 determines whether or not the rider's pedaling posture has changed from sitting to standing. In a case in which the controller 32 determines that the rider's pedaling posture has not changed from sitting to standing, the controller 32 ends the process. In a case in which the controller 32 determines that the rider's pedaling posture has changed from sitting to standing, the controller 32 proceeds to step S42A.

In step S42A, the controller 32 determines whether or not the present assist mode is the assist mode corresponding to the highest ratio A. In a case in which the controller 32 determines that the present assist mode is the assist mode corresponding to the highest ratio A, the controller 32 ends the process. In a case in which the controller 32 determines that the present assist mode is not the assist mode corresponding to the highest ratio A, the controller 32 proceeds to step S43. The controller 32 increases the ratio A in step S43 and proceeds to step S44.

In step S44, the controller 32 determines whether or not the rider's pedaling posture has changed from standing to sitting. Upon determining the rider's pedaling posture has not changed from standing to sitting, the controller 32 again performs the determination process of step S44. Upon determining the rider's pedaling posture has changed from standing to sitting, the controller 32 decreases the ratio A in step S45 and ends the process.

In a case in which the controller 32 determines in step S41 that the transmission ratio R is outside the first range W1, the controller 32 proceeds to step S46. In step S46, the controller 32 determines whether or not the transmission ratio R is in the second range W2. In a case in which the controller 32 determines that the transmission ratio R is in the second range W2, the controller 32 proceeds to step S47. In step S47, the controller 32 determines whether or not the rider's pedaling posture has changed from standing to sitting. In a case in which the controller 32 determines that the rider's pedaling posture has not changed from standing to sitting, the controller 32 ends the process. In a case in which the controller 32 determines that the rider's pedaling posture has changed from standing to sitting, the controller 32 proceeds to step S47A.

In step S47A, the controller 32 determines whether or not the present assist mode is the assist mode corresponding to the lowest ratio A. In a case in which the controller 32 determines that the present assist mode is the assist mode corresponding to the lowest ratio A, the controller 32 ends the process. In a case in which the controller 32 determines that the present assist mode is not the assist mode corresponding to the lowest ratio A, the controller 32 proceeds to step S48. The controller 32 decreases the ratio A in step S48 and proceeds to step S49.

In step S49, the controller 32 determines whether or not the rider's pedaling posture has changed from sitting to standing. Upon determining the rider's pedaling posture has not changed from sitting to standing, the controller 32 again performs the determination process of step S49. Upon determining the rider's pedaling posture has changed from sitting to standing, the controller 32 proceeds to step S50. The controller 32 increases the ratio A in step S50 and ends the process.

In a case in which the controller 32 determines in step S46 that the transmission ratio R is outside the second range W2, the controller 32 ends the process.

Fourth Embodiment

A fourth embodiment of the human-powered vehicle control device 30 will now be described with reference to FIGS. 1 and 7. The human-powered vehicle control device 30 of the fourth embodiment is the same as the human-powered vehicle control device 30 of the first embodiment except that the process shown in FIG. 7 for changing the ratio A is executed instead of the process shown in FIG. 4 for changing the ratio A. Same reference characters are given to those elements that are the same as the corresponding elements of the first embodiment. Such elements will not be described in detail. Those elements that are the same as the corresponding elements of the third embodiment are also given same reference characters and thus will not be described in detail.

The human-powered vehicle control device 30 includes at least one of the sensor 42D and the sensor 42E. The human-powered vehicle control device 30 can include only the sensor 42D, only the sensor 42E, or both the sensor 42D and the sensor 42E. The controller 32 controls the motor 12 in accordance with force G applied to at least one of the saddle and the seatpost detected by the at least one of the sensor 42D and the sensor 42E. Upon determining the force G has changed from greater than or equal to a third predetermined value GX to less than the third predetermined value GX, the controller 32 increases the ratio A. Upon determining the force G applied to the saddle, the seat post, or both the saddle and the seat post has changed from less than a fourth predetermined value GY to greater than or equal to the fourth predetermined value GY, the controller 32 decreases the ratio A. The third predetermined value GX differs from the fourth predetermined value GY. For example, a value corresponding to force G applied by the rider pedaling in a sitting posture is selected as the third predetermined value GX. For example, a value corresponding to force G applied by the rider pedaling in a standing posture is selected as the fourth predetermined value GY. It is preferred that the third predetermined value GX be set to a greater value than the fourth predetermined value GY.

The process for changing the ratio A will now be described with reference to FIG. 7. Upon determining the operating portion 20 is operated and the assist mode is set, the controller 32 starts the process and proceeds to step S21 in the flowchart of FIG. 7. As long as the assist mode is set, the controller 32 executes the process from step S21 in a predetermined cycle.

In step S21, the controller 32 determines whether or not the transmission ratio R is in the first range W1. In a case in which the controller 32 determines that the transmission ratio R is in the first range W1, the controller 32 proceeds to step S61. In step S61, the controller 32 determines whether the force G has changed from greater than or equal to the third predetermined value GX to less than the third predetermined value GX. Upon determining the force G has not changed from greater than or equal to the third predetermined value GX to less than the third predetermined value GX, the controller 32 ends the process. Upon determining the force G has changed from greater than or equal to the third predetermined value GX to less than the third predetermined value GX, the controller 32 proceeds to step S22A.

In step S22A, the controller 32 determines whether or not the present assist mode is the assist mode corresponding to the highest ratio A. In a case in which the controller 32 determines that the present assist mode is the assist mode corresponding to the highest ratio A, the controller 32 ends the process. In a case in which the controller 32 determines that the present assist mode is not the assist mode corresponding to the highest ratio A, the controller 32 proceeds to step S23. In step S23, the controller 32 increases the ratio A and proceeds to step S62.

In step S62, the controller 32 determines whether or not the force G has changed from less than the fourth predetermined value GY to greater than or equal to the fourth predetermined value GY. Upon determining the force G has not changed from less than the fourth predetermined value GY to greater than or equal to the fourth predetermined value GY, the controller 32 again performs the determination process of step S62. Upon determining the force G has changed from less than the fourth predetermined value GY to greater than or equal to the fourth predetermined value GY, the controller 32 proceeds to step S25. The controller 32 decreases the ratio A in step S25 and ends the process.

In a case in which the controller 32 determines in step S21 that the transmission ratio R is outside the first range W1, the controller 32 proceeds to step S26. In step S26, the controller 32 determines whether or not the transmission ratio R is in the second range W2. In a case in which the controller 32 determines that the transmission ratio R is in the second range W2, the controller 32 proceeds to step S27. In step S27, the controller 32 determines whether or not the human driving force TA is less than or equal to the second predetermined value TA2. In a case in which the controller 32 determines that the human driving force TA is greater than the second predetermined value TA2, the controller 32 ends the process. In a case in which the controller 32 determines that the human driving force TA is less than or equal to the second predetermined value TA2, the controller 32 proceeds to step S27A.

In step S27A, the controller 32 determines whether or not the present assist mode is the assist mode corresponding to the lowest ratio A. In a case in which the controller 32 determines that the present assist mode is the assist mode corresponding to the lowest ratio A, the controller 32 ends the process. In a case in which the controller 32 determines that the present assist mode is not the assist mode corresponding to the lowest ratio A, the controller 32 proceeds to step S28. The controller 32 decreases the ratio A in step S28 and proceeds to step S29.

In step S29, the controller 32 determines whether or not the human driving force TA is greater than the second predetermined value TA2. Upon determining the human driving force TA is less than or equal to the second predetermined value TA2, the controller 32 again performs the determination process of step S29. Upon determining the human driving force TA is greater than the second predetermined value TA2, the controller 32 proceeds to step S30. The controller 32 increases the ratio A in step S30 and ends the process.

In a case in which the controller 32 determines in step S26 that the transmission ratio R is outside the second range W2, the controller 32 ends the process.

Fifth Embodiment

A fifth embodiment of the human-powered vehicle control device 30 will now be described with reference to FIGS. 1 and 8. The human-powered vehicle control device 30 of the fifth embodiment is the same as the human-powered vehicle control device 30 of the fourth embodiment except that the process shown in FIG. 8 for changing the ratio A is executed instead of the process shown in FIG. 7 for changing the ratio A. Same reference characters are given to those elements that are the same as the corresponding elements of the fourth embodiment. Such elements will not be described in detail.

Upon determining the transmission ratio R of the human-powered vehicle B is in the predetermined range W, the controller 32 changes the ratio A of output of the motor 12 to the human driving force TA that is input to the human-powered vehicle B in accordance with input information received from the sensor 42 provided on the human-powered vehicle B. The input information received from the sensor 42 includes the force G applied to at least one of the saddle and the seatpost. The controller 32 controls the motor 12 in accordance with the force G applied to the at least one of the saddle and the seatpost detected by the at least one of the sensor 42D and the sensor 42E. Upon determining the force G has changed from greater than or equal to the third predetermined value GX to less than the third predetermined value GX, the controller 32 increases the ratio A. Upon determining the force G applied to the at least one of the saddle and the seatpost has changed from less than the fourth predetermined value GY to greater than or equal to the fourth predetermined value GY, the controller 32 decreases the ratio A.

The process for changing the ratio A will now be described with reference to FIG. 8. Upon determining the operating portion 20 is operated and the assist mode is set, the controller 32 starts the process and proceeds to step S71 in the flowchart of FIG. 8. As long as the assist mode is set, the controller 32 executes the process from step S71 in a predetermined cycle.

In step S71, the controller 32 determines whether or not the transmission ratio R is in the predetermined range W. In a case in which the controller 32 determines that the transmission ratio R is outside the predetermined range W, the controller 32 ends the process. In a case in which the controller 32 determines that the transmission ratio R is in the predetermined range W, the controller 32 proceeds to step S72. In step S72, the controller 32 determines that the force G has changed from greater than or equal to the third predetermined value GX to less than the third predetermined value GX. Upon determining the force G has changed from greater than or equal to the third predetermined value GX to less than the third predetermined value GX, the controller 32 proceeds to step S72A.

In step S72A, the controller 32 determines whether or not the present assist mode is the assist mode corresponding to the highest ratio A. n a case in which the controller 32 determines that the present assist mode is the assist mode corresponding to the highest ratio A, the controller 32 ends the process. In a case in which the controller 32 determines that the present assist mode is not the assist mode corresponding to the highest ratio A, the controller 32 proceeds to step S73. The controller 32 increases the ratio A in step S73 and ends the process.

In step S74, the controller 32 determines whether or not the force G has changed from less than the fourth predetermined value GY to greater than or equal to the fourth predetermined value GY. Upon determining the force G has not changed from less than the fourth predetermined value GY to greater than or equal to the fourth predetermined value GY, the controller 32 ends the process. Upon determining the force G has changed from less than the fourth predetermined value GY to greater than or equal to the fourth predetermined value GY, the controller 32 proceeds to step S74A.

In step S74A, the controller 32 determines whether or not the present assist mode is the assist mode corresponding to the lowest ratio A. In a case in which the controller 32 determines that the present assist mode is the assist mode corresponding to the lowest ratio A, the controller 32 ends the process. In a case in which the controller 32 determines that the present assist mode is not the assist mode corresponding to the lowest ratio A, the controller 32 proceeds to step S75. The controller 32 decreases the ratio A in step S75 and ends the process.

Modifications

The description related to the above embodiments exemplifies, without any intention to limit, applicable forms of a human-powered vehicle control device according to the present disclosure. The human-powered vehicle control device according to the present disclosure is applicable to, for example, modifications of the embodiments that are described above and combinations of two or more of the modifications that do not contradict each other. In the modifications described below, same reference characters are given to those elements that are the same as the corresponding elements of the embodiments. Such elements will not be described in detail.

In the first embodiment, upon determining the transmission ratio R is in the first range W1 and the human driving force TA is greater than or equal to the first predetermined value TA1, if the human driving force TA has changed to less than a seventh predetermined value TAA after the ratio A is increased, the controller 32 can decrease the ratio A. More specifically, in step S24 of the flowchart in FIG. 4, the determination is made using the seventh predetermined value TAA instead of the first predetermined value TA1. The seventh predetermined value TAA is smaller than the first predetermined value TA1. With such a configuration, upon determining the human driving force TA varies in the proximity of the first predetermined value TA1 or the seventh predetermined value TAA, the process for changing the ratio A will not be frequently executed. This reduces the loads on the controller 32.

In the first embodiment, upon determining the transmission ratio R is in the second range W2 and the human driving force TA is less than or equal to the second predetermined value TA2, if the human driving force TA has changed to greater than an eighth predetermined value TAB after the ratio A is decreased, the controller 32 can increase the ratio A. More specifically, in step S29 of the flowchart in FIG. 4, the determination is made using the eighth predetermined value TAB instead of the second predetermined value TA2. The eighth predetermined value TAB is greater than the second predetermined value TA2. With such a configuration, upon determining the human driving force TA varies in the proximity of the second predetermined value TA2 or the eighth predetermined value TAB, the process for changing the ratio A will not be frequently executed. This reduces the loads on the controller 32.

In each embodiment, in the case of increasing the ratio A, the controller 32 can change the ratio A by adding or multiplying the present ratio A and a predetermined value instead of by changing the assist mode. As long as the ratio A is changed as a result, the controller 32 can change the numeral value of the ratio A used in calculation. Alternatively, the controller 32 can increase the output torque TM of the motor 12 instead of changing the numeral value of the ratio A used in calculation. In this case, in the first embodiment, step S22A can be omitted from the flowchart of FIG. 4. In the second embodiment, step S22A can be omitted from the flowchart of FIG. 5. In the third embodiment, step S42A can be omitted from the flowchart of FIG. 6. In the fourth embodiment, step S22A can be omitted from the flowchart of FIG. 7. In the fifth embodiment, step S72A can be omitted from the flowchart of FIG. 8.

In each embodiment, in the case of decreasing the ratio A, the controller 32 can change the ratio A by subtracting a predetermined value from the present ratio A or multiplying a predetermined value and the present ratio A instead of by changing the assist mode. As long as the ratio A is changed as a result, the controller 32 can change the numeral value of the ratio A used in calculation. Alternatively, the controller 32 can decrease the output torque TM of the motor 12 instead of changing the numeral value of the ratio A used in calculation. In this case, in the first embodiment, step S27A can be omitted from the flowchart of FIG. 4. In the second embodiment, step S27A can be omitted from the flowchart of FIG. 5. In the third embodiment, step S47A can be omitted from the flowchart of FIG. 6. In the fourth embodiment, step S27A can be omitted from the flowchart of FIG. 7. In the fifth embodiment, step S74A can be omitted from the flowchart of FIG. 8.

Figure 9:
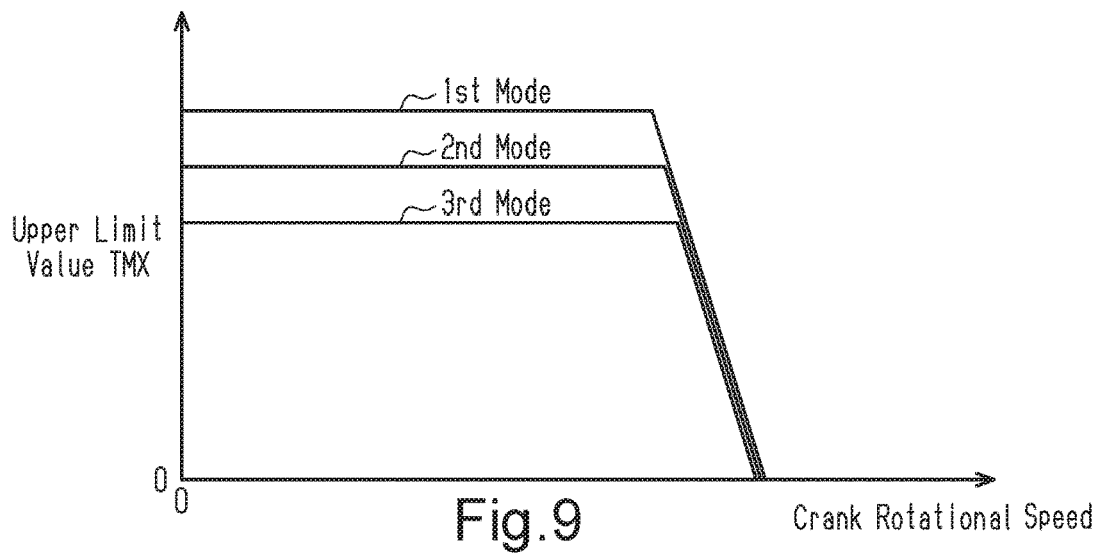
FIG. 9 is a prestored control map showing one example of a relationship between a crank rotational speed and an upper limit value stored in the memory device of the human-powered vehicle control device shown in FIG. 1.

In each embodiment, instead of changing the ratio A in accordance with the human driving force TA upon determining the transmission ratio R of the human-powered vehicle B is in the predetermined range W, the controller 32 can change the upper limit value TMX of the output torque TM of the motor 12 with respect to the human driving force TA in accordance with the human driving force TA upon determining the transmission ratio R of the human-powered vehicle B is in the predetermined range W. It is preferred that the upper limit value TMX be set in accordance with properties of the motor 12. The upper limit value TMX is set to a value smaller than the output torque TM that can be output by the motor 12. In one example, as shown in FIG. 9, the upper limit value TMX is set for each assist mode. In each assist mode, the upper limit value TMX is set to be constant until the rotational speed of the crank reaches a predetermined value and be decreased as the rotational speed of the crank is increased from the predetermined value. It is preferred that the upper limit value TMX be set to be higher for modes corresponding to a higher ratio A. In this case, the controller 32 increases the upper limit value TMX by changing the assist mode so that the ratio A is increased by one step. In one example, the controller 32 decreases the upper limit value TMX by changing the assist mode so that the ratio A is decreased by one step. Upon determining the assist mode includes, for example, thee operation modes, namely, the first mode, the second mode, and the third mode, the upper limit value TMX includes a first upper limit value TMX1, a second upper limit value TMX2 that is smaller than the first upper limit value TMX1, and a third upper limit value TMX3 that is smaller than the second upper limit value TMX2. In the first mode, the upper limit value TMX is the first upper limit value TMX1. In the second mode, the upper limit value TMX is the second upper limit value TMX2. In the third mode, the upper limit value TMX is the third upper limit value TMX3. The assist mode can include two assist modes or four or more assist modes.

Figure 10:
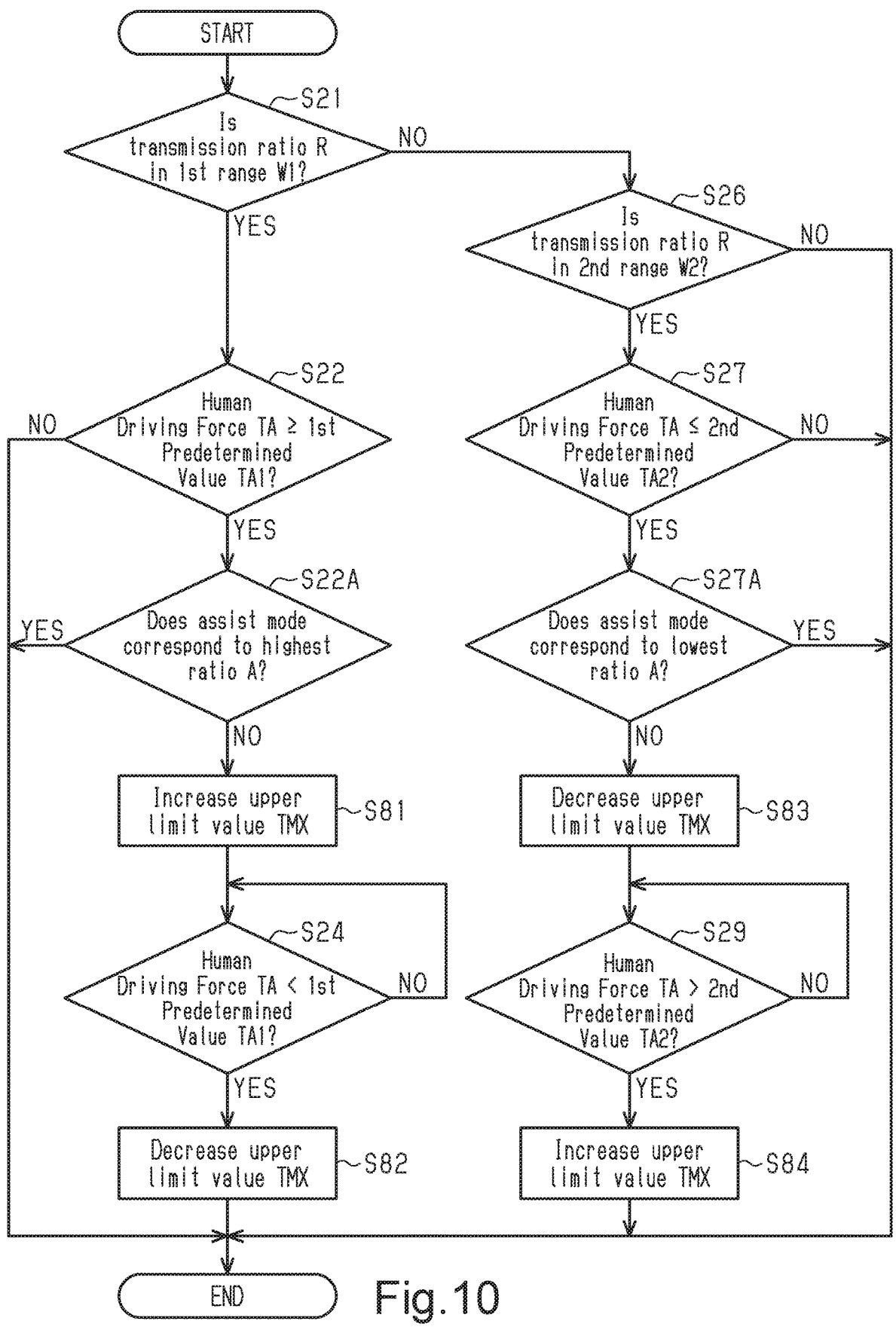
FIG. 10 is a flowchart of a control process for changing the upper limit value that is executed by a first modification of the electronic controller of the first embodiment.

For example, in the first embodiment, upon determining the transmission ratio R is in the first range W1 and the human driving force TA is greater than or equal to the first predetermined value TA1, the controller 32 increases the upper limit value TMX. After the upper limit value TMX is increased in a case in which the transmission ratio R is in the first range W1 and the human driving force TA is greater than or equal to the first predetermined value TA1, if the human driving force TA has changed to less than or equal to the first predetermined value TA1, the controller 32 decreases the upper limit value TMX. More specifically, the controller 32 executes step S81 of FIG. 10 instead of step S23 of FIG. 4 and executes step S82 of FIG. 10 instead of step S25 of FIG. 4. In step S81, the controller 32 increases the upper limit value TMX. In step S82, the controller 32 decreases the upper limit value TMX. Upon determining the transmission ratio R is in the second range W2 and the human driving force TA is less than or equal to the second predetermined value TA2, the controller 32 decreases the upper limit value TMX. After the upper limit value TMX is decreased in a case in which the transmission ratio R is in the second range W2 and the human driving force TA is less than or equal to the second predetermined value TA2, if the human driving force TA has changed to greater than the second predetermined value TA2, the controller 32 increases the upper limit value TMX. More specifically, the controller 32 executes step S83 of FIG. 10 instead of step S28 of FIG. 4 and executes step S84 of FIG. 10 instead of step S30 of FIG. 4. In step S83, the controller 32 decreases the upper limit value TMX. In step S84, the controller 32 increases the upper limit value TMX.

Figure 11:
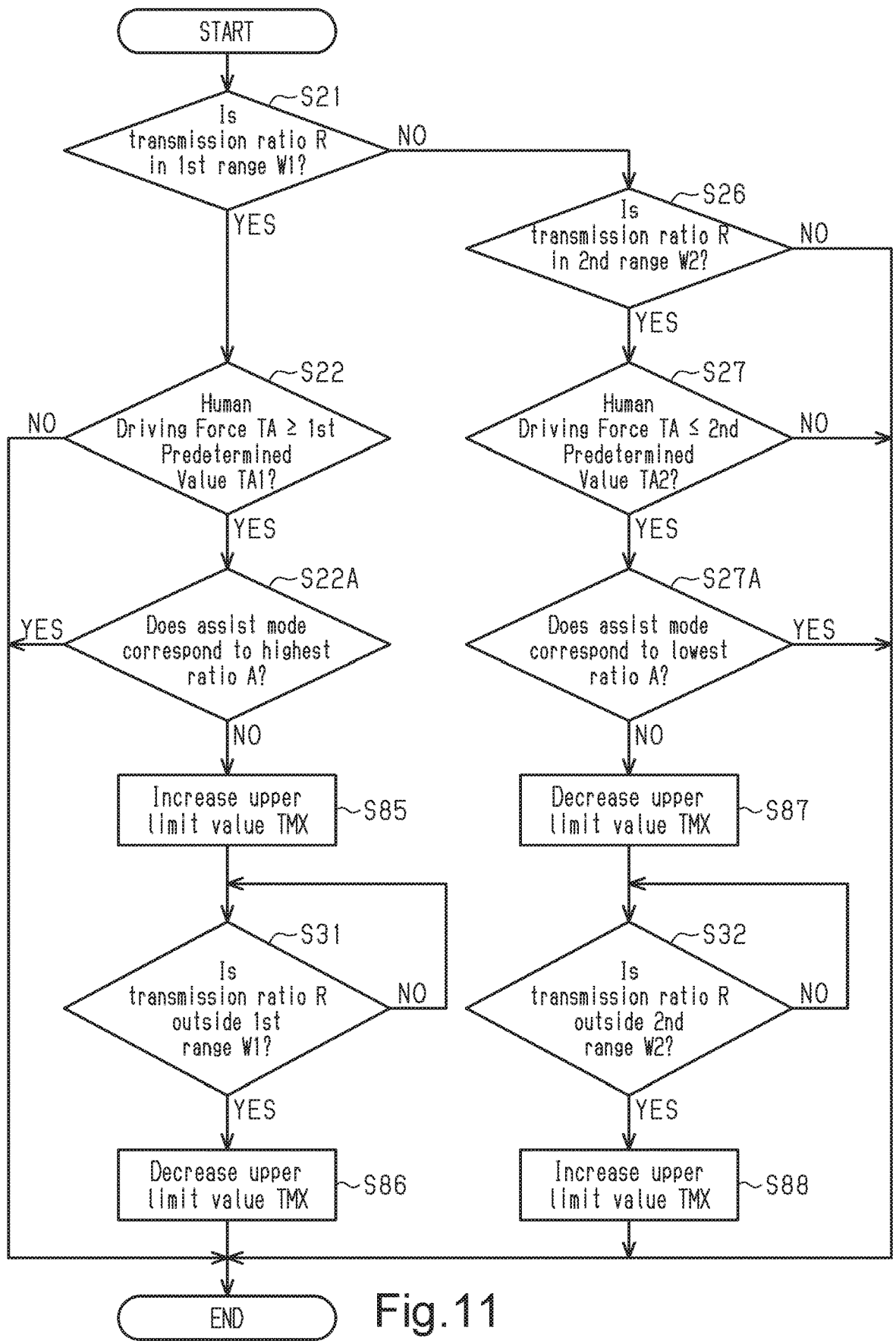
FIG. 11 is a flowchart of a control process for changing the upper limit value that is executed by a modification of the electronic controller of the second embodiment.

For example, in the second embodiment, upon determining the transmission ratio R is in the first range W1 and the human driving force TA is greater than or equal to the first predetermined value TA1, the controller 32 increases the upper limit value TMX. After the upper limit value TMX is increased in a case in which the transmission ratio R is in the first range W1 and the human driving force TA is greater than or equal to the first predetermined value TA1, if the transmission ratio R has changed to a transmission ratio R that is greater than the transmission ratio R included in the first range W1, the controller 32 decreases the upper limit value TMX. More specifically, the controller 32 executes step S85 of FIG. 11 instead of step S23 of FIG. 5 and executes step S86 of FIG. 11 instead of step S25 of FIG. 5. In step S85, the controller 32 increases the upper limit value TMX. In step S86, the controller 32 decreases the upper limit value TMX. Upon determining the transmission ratio R is in the second range W2 and the human driving force TA is less than or equal to the second predetermined value TA2, the controller 32 decreases the at least one of the ratio A and the upper limit value TMX. After the upper limit value TMX is decreased in a case in which the transmission ratio R is in the second range W2 and the human driving force TA is less than or equal to the second predetermined value TA2, if the transmission ratio R has changed to a transmission ratio R that is smaller than the transmission ratio R included in the second range W2, the controller 32 increases the upper limit value TMX. More specifically, the controller 32 executes step S87 of FIG. 11 instead of step S28 of FIG. 5 and executes step S88 of FIG. 11 instead of step S30 of FIG. 5. In step S87, the controller 32 decreases the upper limit value TMX. In step S88, the controller 32 increases the upper limit value TMX.

Figure 12:
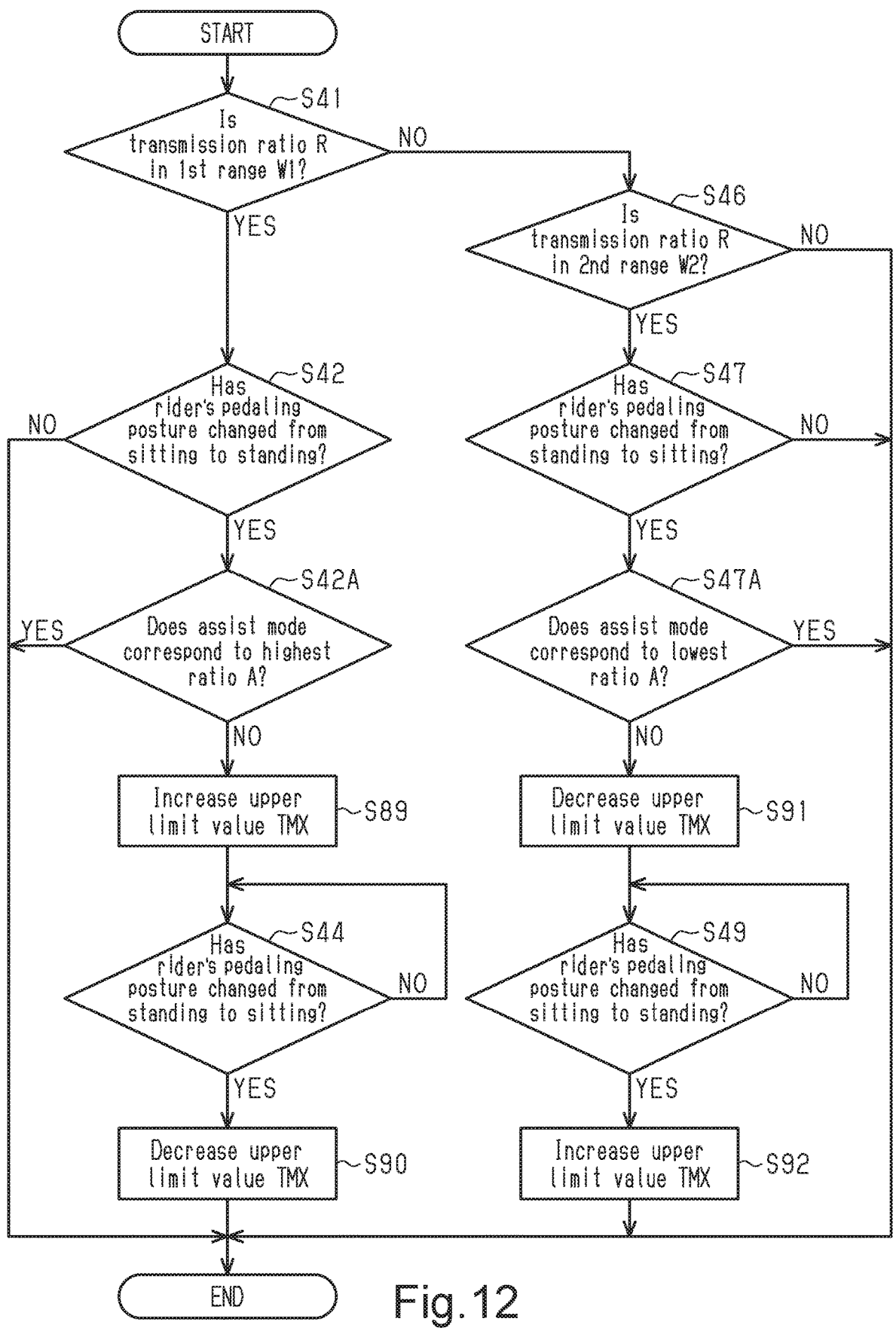
FIG. 12 is a flowchart of a control process for changing the upper limit value that is executed by a first modification of the electronic controller of the third embodiment.

For example, in the third embodiment, upon determining the transmission ratio R of the human-powered vehicle is in the predetermined range W, the controller 32 changes the upper limit value TMX in accordance with the rider's pedaling posture of the rider of the human-powered vehicle B. Upon determining the transmission ratio R is in the first range W1 and the rider's pedaling posture has changed from sitting to standing, the controller 32 increases the upper limit value TMX. More specifically, the controller 32 executes step S89 of FIG. 12 instead of step S43 of FIG. 6 and executes step S90 of FIG. 12 instead of step S45 of FIG. 6. In step S89, the controller 32 increases the upper limit value TMX. In step S90, the controller 32 decreases the upper limit value TMX. Upon determining the transmission ratio R is in the second range W2 and the rider's pedaling posture has changed from standing to sitting, the controller 32 decreases the upper limit value TMX. More specifically, the controller 32 executes step S91 of FIG. 12 instead of step S48 of FIG. 6 and executes step S92 of FIG. 12 instead of step S50 of FIG. 6. In step S91, the controller 32 decreases the upper limit value TMX. In step S92, the controller 32 increases the upper limit value TMX.

Figure 13:
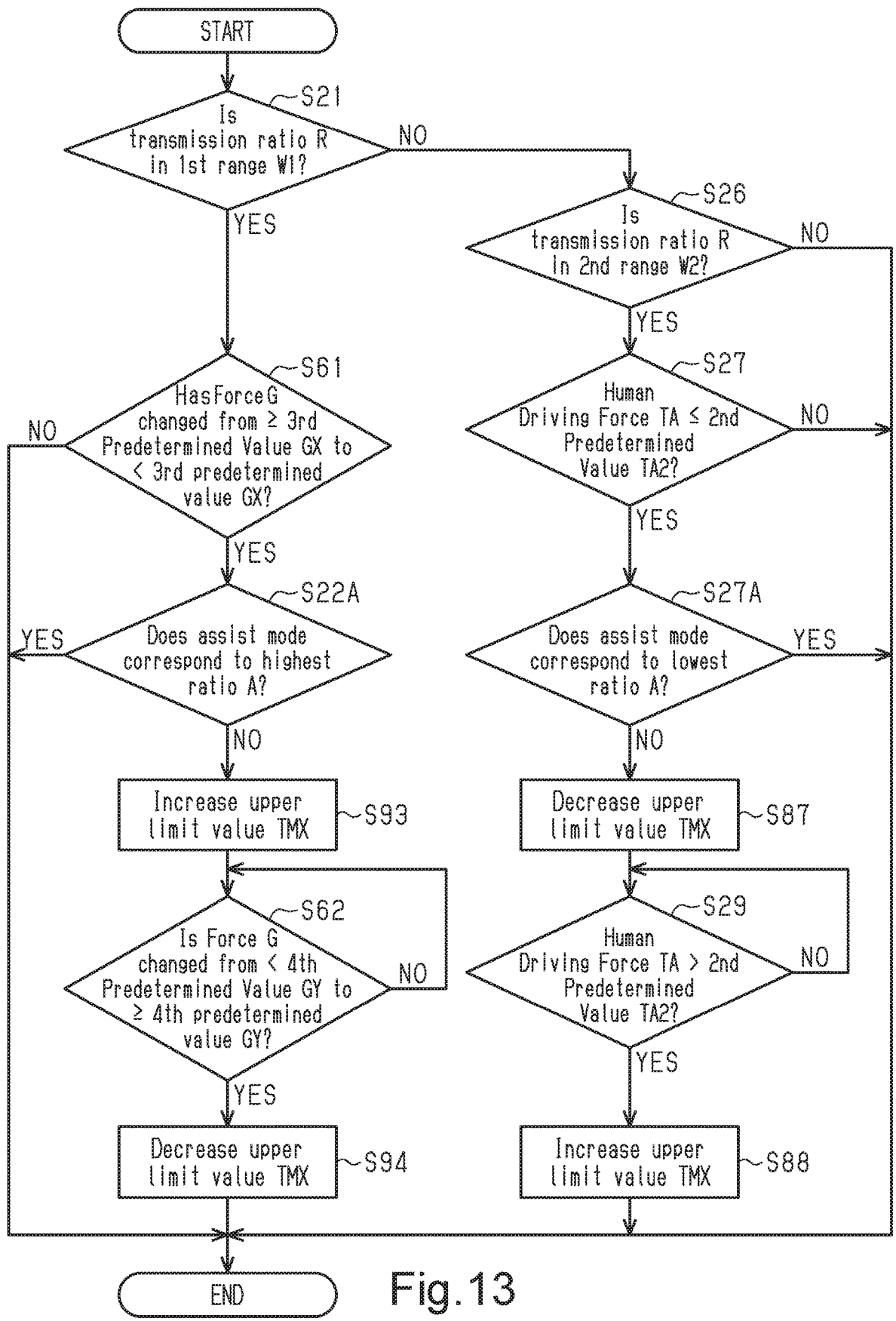
FIG. 13 is a flowchart of a control process for changing the upper limit value that is executed by a modification of the electronic controller of the fourth embodiment.

For example, in the fourth embodiment, upon determining the force G has changed from greater than or equal to the third predetermined value GX to less than the third predetermined value GX, the controller 32 increases the upper limit value TMX. Upon determining the force G, which is applied to the at least one of the saddle and the seatpost, has changed from less than the fourth predetermined value GY to greater than or equal to the fourth predetermined value GY, the controller 32 decreases the upper limit value TMX. More specifically, the controller 32 executes step S93 of FIG. 13 instead of step S23 of FIG. 7 and executes step S94 of FIG. 13 instead of step S25 of FIG. 7. In step S93, the controller 32 increases the upper limit value TMX. In step S94, the controller 32 decreases the upper limit value TMX.

Figure 14:
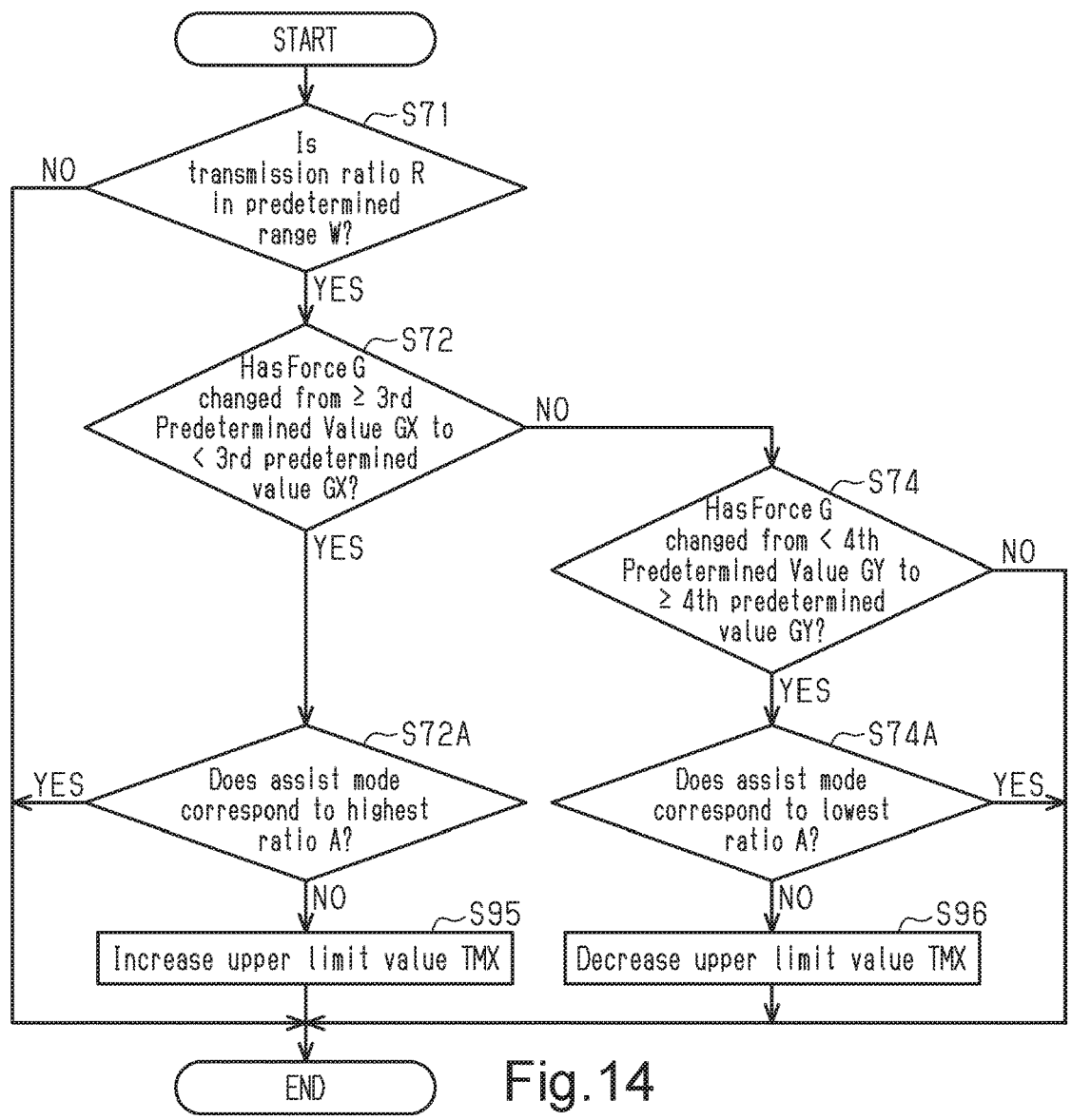
FIG. 14 is a flowchart of a control process for changing the upper limit value that is executed by a modification of the electronic controller of the fifth embodiment.

For example, in the fifth embodiment, upon determining the force G has changed from greater than or equal to the third predetermined value GX to less than the third predetermined value GX, the controller 32 increases the ratio A. Upon determining the force G, which is applied to the at least one of the saddle and the seatpost, has changed from less than the fourth predetermined value GY to greater than or equal to the fourth predetermined value GY, the controller 32 decreases the ratio A. The third predetermined value GX differs from the fourth predetermined value GY. More specifically, the controller 32 executes step S95 of FIG. 14 instead of step S73 of FIG. 8 and executes step S96 of FIG. 14 instead of step S75 of FIG. 8. In step S95, the controller 32 increases the upper limit value TMX. In step S96, the controller 32 decreases the upper limit value TMX.

Figure 15:
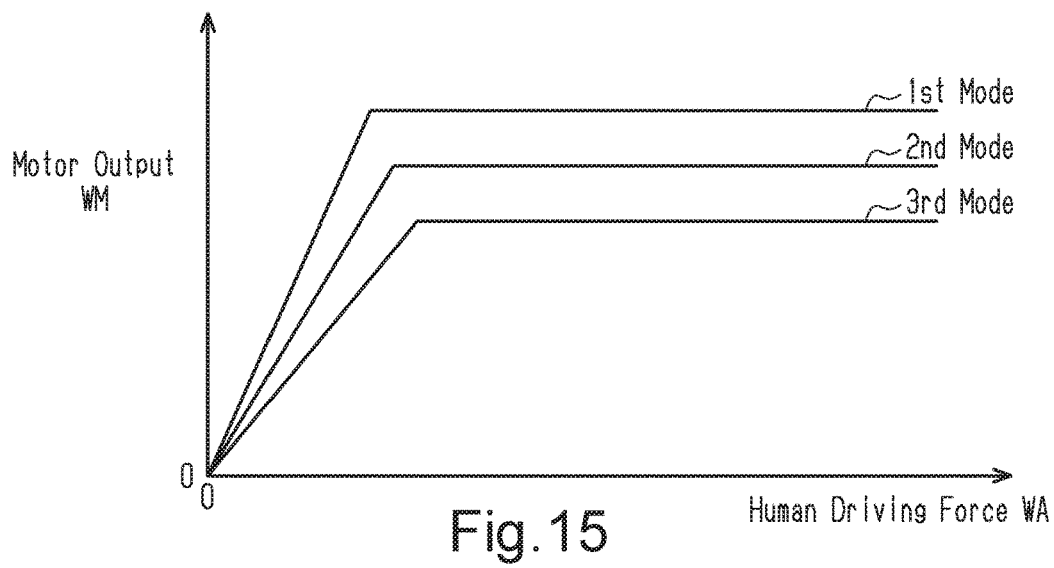
FIG. 15 is a prestored control map showing one example of a relationship between the human power output and a motor output stored in the memory device shown in FIG. 1.

The human driving force can include power that is input to the crank arms of the human-powered vehicle B. For example, in each of the embodiments and modifications, human driving force WA that is input to the crank arms of the human-powered vehicle B can be used as the human driving force instead of a torque of human power input to the crank arms, and an output WM of the motor 12 can be used as the output of the motor 12 instead of the output torque TM of the motor 12. The human driving force WA is expressed in power (WATT). The output WM of the motor 12 is expressed in power (WATT). In this case, the human driving force WA is obtained by multiplying a torque of human power input to the crank arms and rotational speed of the crank. The output WM of the motor 12 is obtained by multiplying the output torque TM of the motor 12 and rotational speed of the motor 12. The controller 32 can be configured to use a different ratio of the power of the motor 12 to the power input to the crank arms of the human-powered vehicle B in each assist mode. For example, as shown in FIG. 15, the ratio of the output WM of the motor 12 to the human driving force WA in the first mode is greater than the ratio of the output WM of the motor 12 to the human driving force WA in the second mode. The ratio of the output WM of the motor 12 to the human driving force WA in the second mode is greater than the ratio of the output WM of the motor 12 to the human driving force WA in the third mode.

The human driving force can include an average torque that is input to the crank arms of the human-powered vehicle B. For example, in each of the embodiments and modifications, a value obtained by averaging input torques in one rotation of the crank can be used as the human driving force instead of the input torque input to the crank arms in a case in which the crank arms of the human-powered vehicle B are located at the predetermined rotational angle. The average torque can be an average value of input torques in a period less than one rotation of the crank or can be an average value of input torques in a period exceeding one rotation of the crank.

Figure 16:
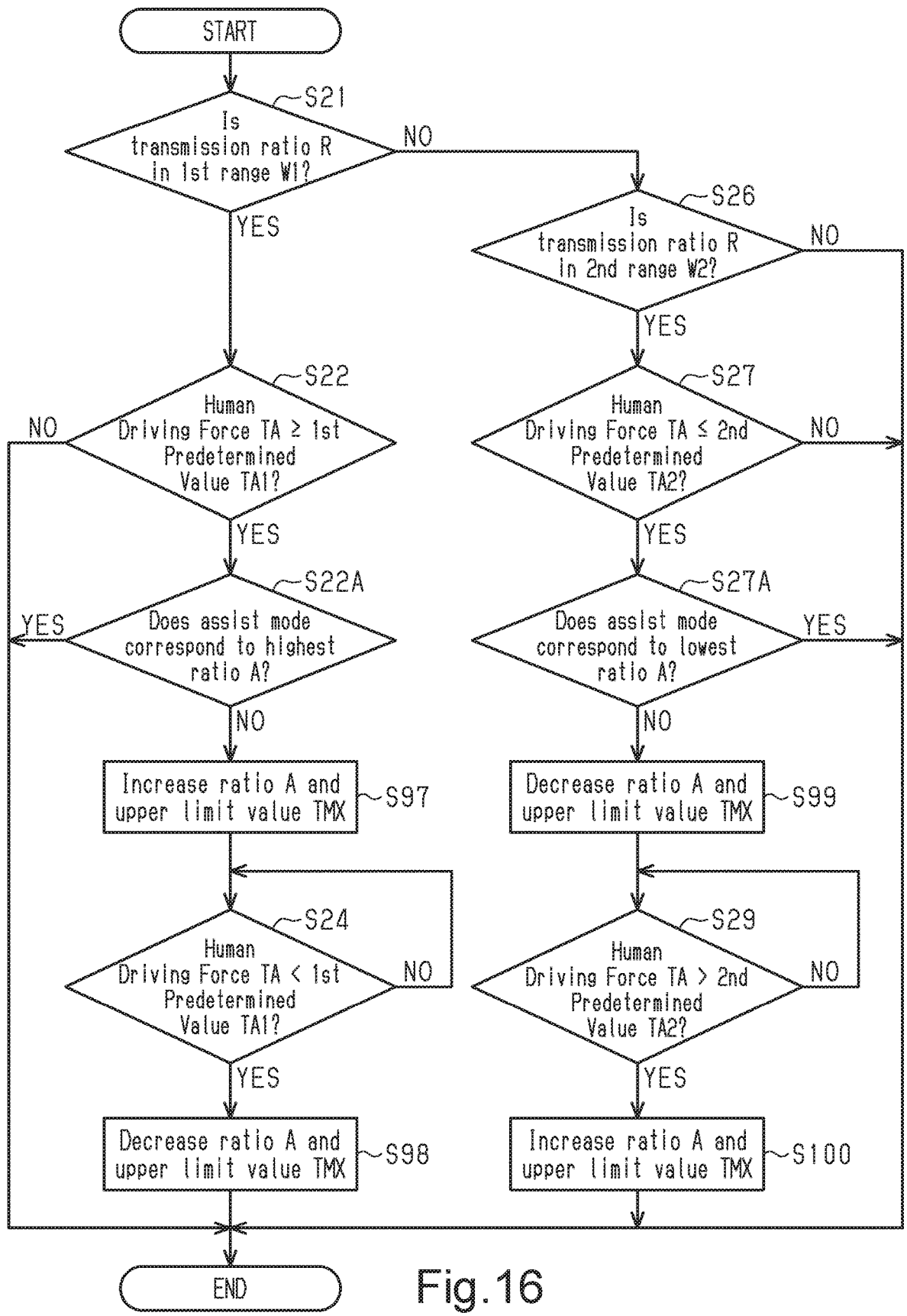
FIG. 16 is a flowchart of a control process for changing the ratio and the upper limit value that is executed by a second modification of the electronic controller of the first embodiment.

Upon determining the transmission ratio R of the human-powered vehicle B is in the predetermined range W, the controller 32 can be configured to change the ratio A and the upper limit value TMX in accordance with the human driving force TA. For example, in the first embodiment, upon determining the transmission ratio R is in the first range W1 and the human driving force TA is greater than or equal to the first predetermined value TA1, the controller 32 increases the ratio A and the upper limit value TMX. After the ratio A and the upper limit value TMX are increased in a case in which the transmission ratio R is in the first range W1 and the human driving force TA is greater than or equal to the first predetermined value TA1, if the human driving force TA has changed to less than the first predetermined value TA1, the controller 32 decreases the ratio A and the upper limit value TMX. More specifically, the controller 32 executes step S97 of FIG. 16 instead of step S23 of FIG. 4 and executes step S98 of FIG. 16 instead of step S25 of FIG. 4. In step S97, the controller 32 increases the ratio A and the upper limit value TMX. In step S98, the controller 32 decreases the ratio A and the upper limit value TMX. Upon determining the transmission ratio R is in the second range W2 and the human driving force TA is less than or equal to the second predetermined value TA2, the controller 32 decreases the ratio A and the upper limit value TMX. After the ratio A and the upper limit value TMX are decreased in a case in which the transmission ratio R is in the second range W2 and the human driving force TA is less than or equal to the second predetermined value TA2, if the human driving force TA has changed to greater than the second predetermined value TA2, the controller 32 increases the ratio A and the upper limit value TMX. More specifically, the controller 32 executes step S99 of FIG. 16 instead of step S28 of FIG. 4 and executes step S100 of FIG. 16 instead of step S30 of FIG. 4. In step S99, the controller 32 decreases the ratio A and the upper limit value TMX. In step S100, the controller 32 increases the ratio A and the upper limit value TMX.

Figure 5:
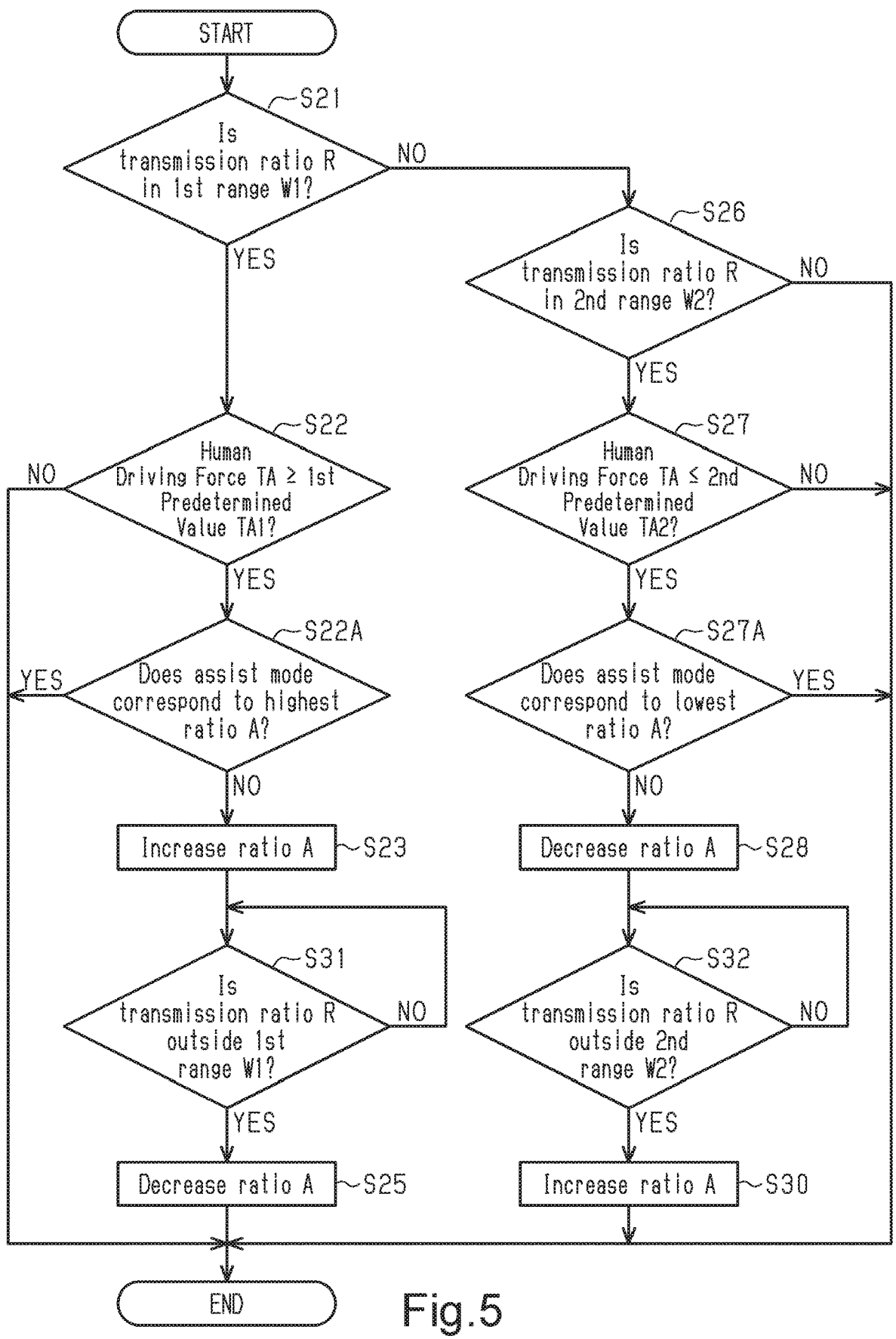
FIG. 5 is a flowchart of a control process for changing the ratio that is executed by a second embodiment of an electronic controller.

In the second embodiment, in step S23 of FIG. 5, the controller 32 increases the ratio A and the upper limit value TMX. In step S25 of FIG. 5, the controller 32 decreases the ratio A and the upper limit value TMX. In step S28 of FIG. 5, the controller 32 decreases the ratio A and the upper limit value TMX. In step S30 of FIG. 5, the controller 32 increases the ratio A and the upper limit value TMX.

Figure 6:
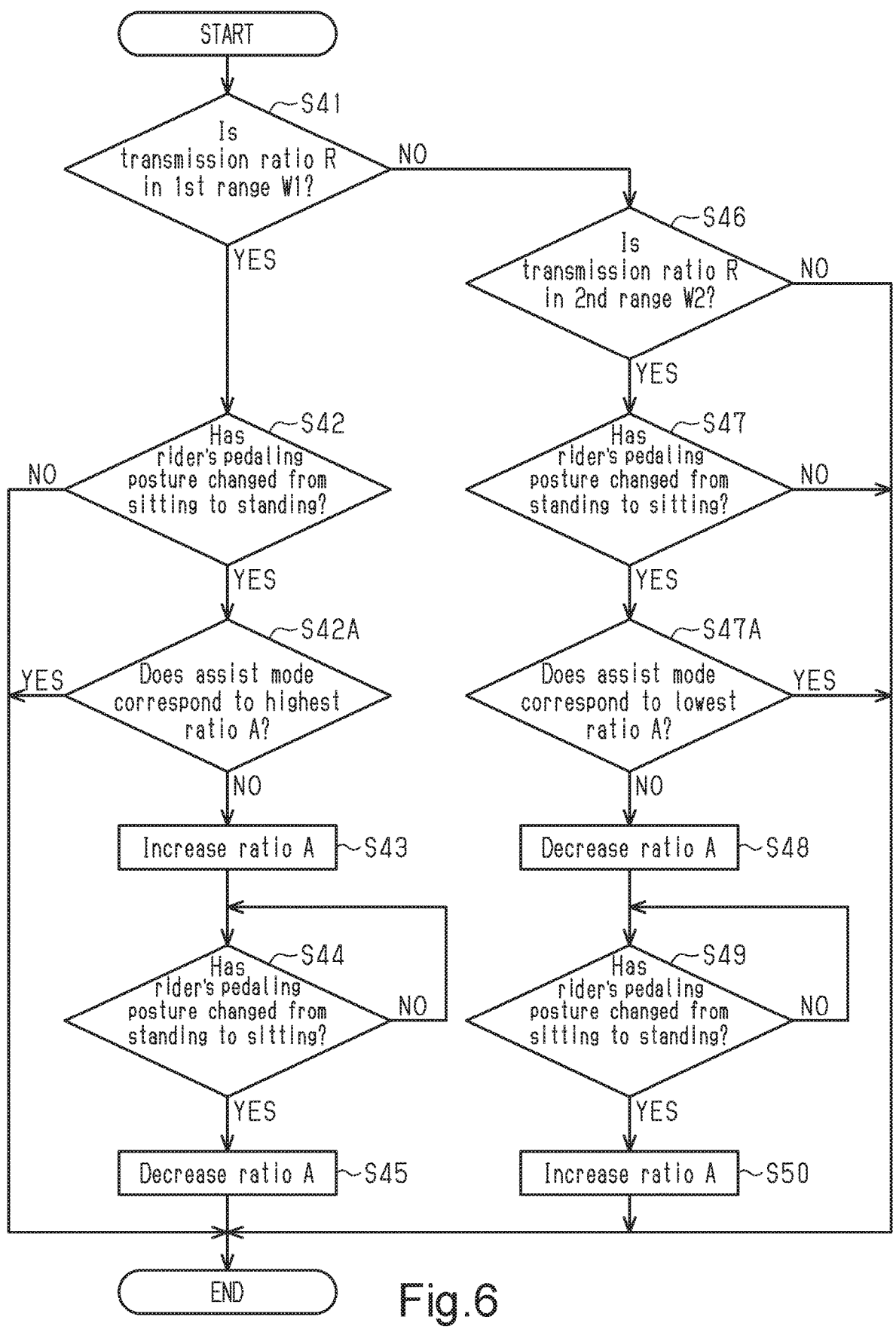
FIG. 6 is a flowchart of control process for changing the ratio that is executed by a third embodiment of an electronic controller.

In the third embodiment, in step S43 of FIG. 6, the controller 32 increases the ratio A and the upper limit value TMX. In step S45, the controller 32 decreases the ratio A and the upper limit value TMX. In step S48 of FIG. 6, the controller 32 decreases the ratio A and the upper limit value TMX. In step S50 of FIG. 6, the controller 32 increases the ratio A and the upper limit value TMX.

Figure 7:
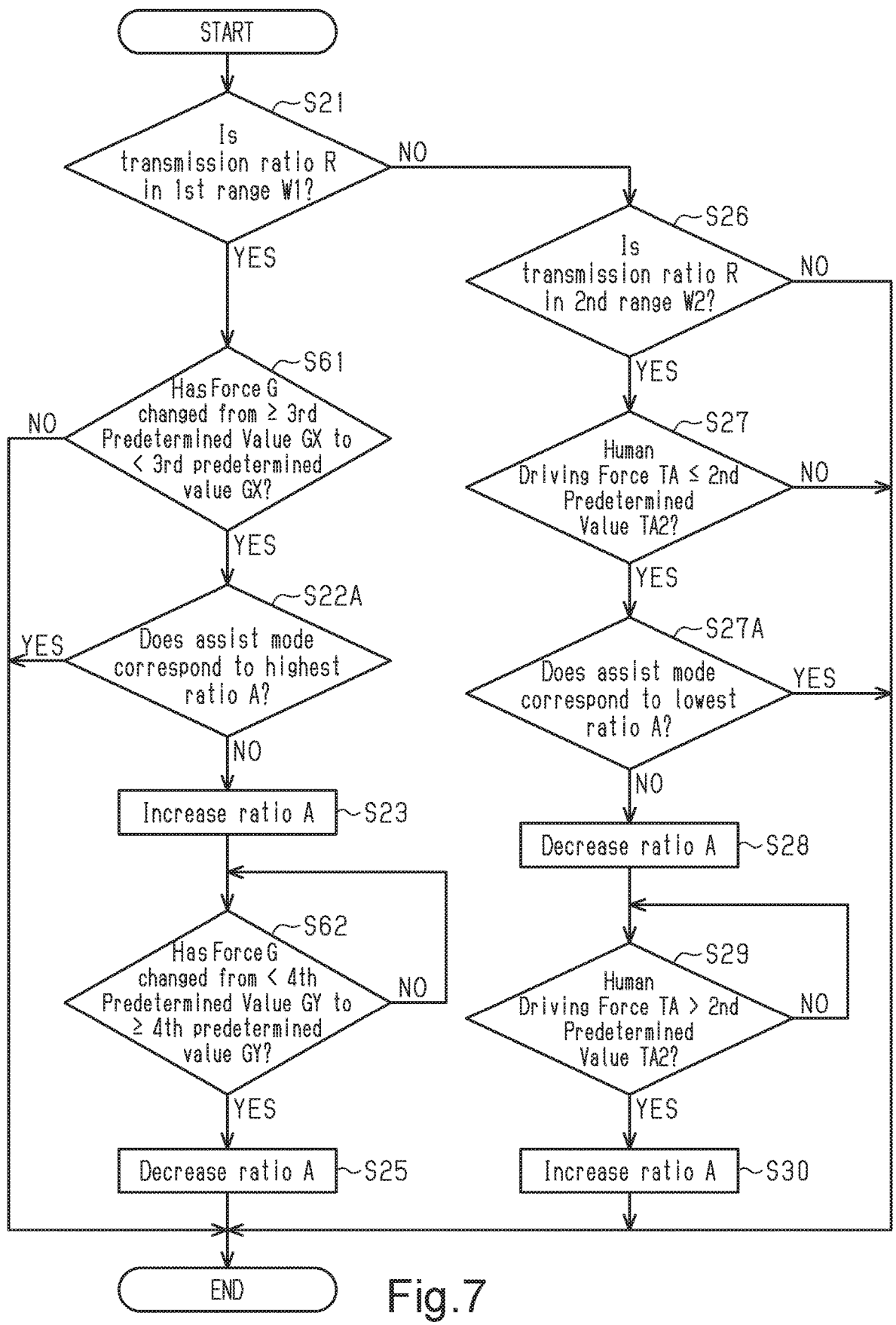
FIG. 7 is a flowchart of a control process for changing the ratio that is executed by a fourth embodiment of an electronic controller.

In the fourth embodiment, in step S23 of FIG. 7, the controller 32 increases the ratio A and the upper limit value TMX. In step S25 of FIG. 7, the controller 32 decreases the ratio A and the upper limit value TMX.

Figure 8:
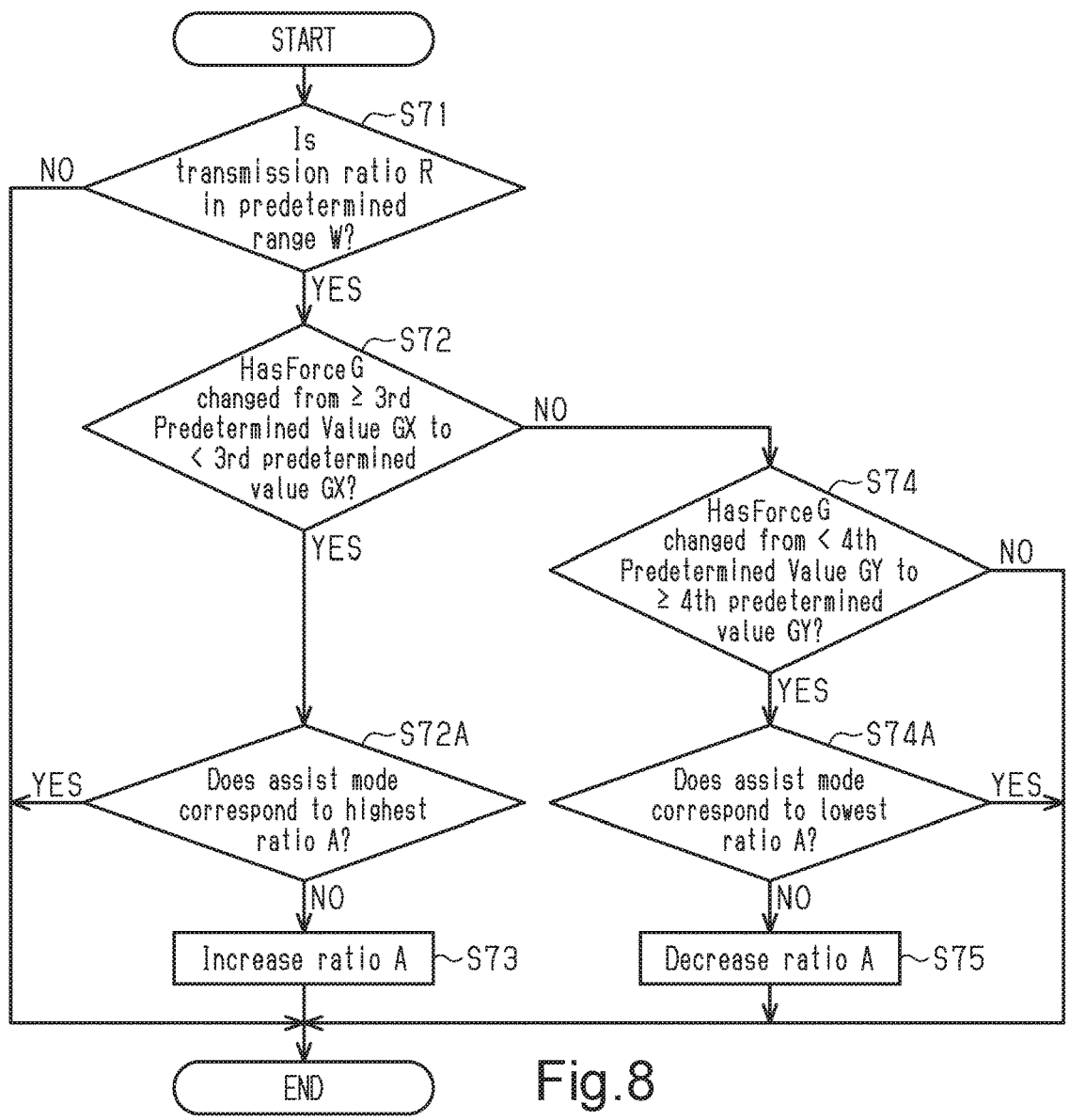
FIG. 8 is a flowchart of a control process for changing the ratio that is executed by a fifth embodiment of an electronic controller.

In the fifth embodiment, in step S73 of FIG. 8, the controller 32 increases the ratio A and the upper limit value TMX. In step S75 of FIG. 8, the controller 32 decreases the ratio A and the upper limit value TMX.

In each of the modifications described above, in the case of increasing the upper limit value TMX, the controller 32 can change the upper limit value TMX by adding or multiplying the present upper limit value TMX and a predetermined value instead of by changing the assist mode. In this case, in the first embodiment, step S22A can be omitted from the flowchart of FIG. 4. In the second embodiment, step S22A can be omitted from the flowchart of FIG. 5. In the third embodiment, step S42A can be omitted from the flowchart of FIG. 6. In the fourth embodiment, step S22A can be omitted from the flowchart of FIG. 7. In the fifth embodiment, step S72A can be omitted from the flowchart of FIG. 8.

In each of the modifications described above, in the case of decreasing the upper limit value TMX, the controller 32 can change the upper limit value TMX by subtracting a predetermined value from the present upper limit value TMX or multiplying a predetermined value and the present upper limit value TMX instead of by changing the assist mode. In this case, in the first embodiment, step S27A can be omitted from the flowchart of FIG. 4. In the second embodiment, step S27A can be omitted from the flowchart of FIG. 5. In the third embodiment, step S47A can be omitted from the flowchart of FIG. 6. In the fourth embodiment, step S27A can be omitted from the flowchart of FIG. 7. In the fifth embodiment, step S74A can be omitted from the flowchart of FIG. 8.

Figure 4:
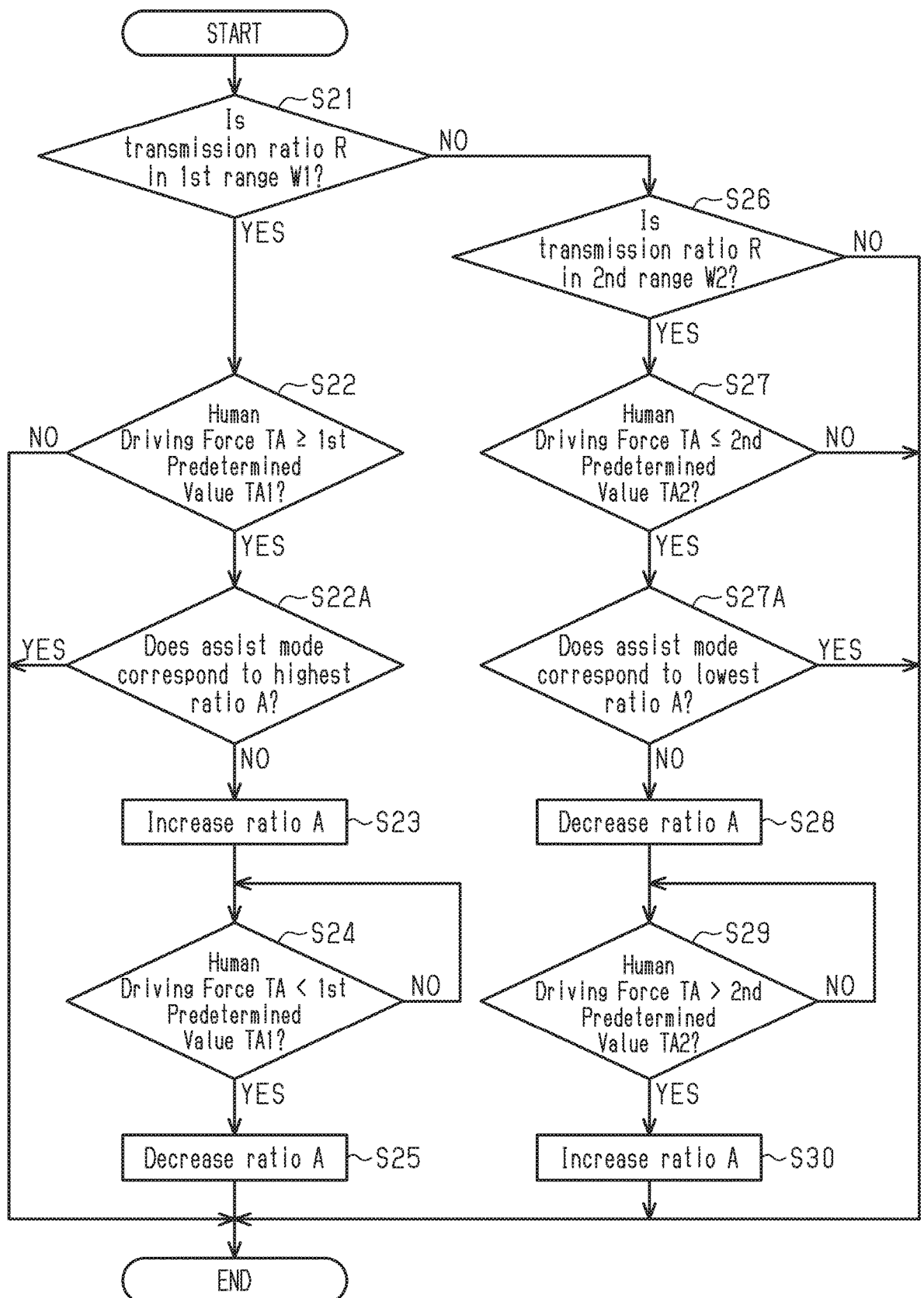
FIG. 4 is a flowchart of a control process for changing a ratio that is executed by the electronic controller shown in FIG. 1.

In the flowchart of FIG. 5 of the second embodiment, step S24 of FIG. 4 in the first embodiment can be added between step S23 and step S31. In this case, if the negative determination is made in step S31, the controller 32 proceeds to step S24. If the affirmative determination is made in step S24, the controller 32 proceeds to step S25. Step S31 and step S24 can be switched to each other.

In the flowchart of FIG. 5 of the second embodiment, step S29 of FIG. 4 of the first embodiment can be added between step S28 and step S32. In this case, if the negative determination is made step S32, the controller 32 proceeds to step S29. If the affirmative determination is made in step S29, the controller 32 proceeds to step S30. Step S32 and step S29 can be switched to each other.

In the flowchart of FIG. 6 of the third embodiment, step S31 of FIG. 5 of the second embodiment can be added between step S44 and step S45. In this case, if the negative determination is made in step S31, the controller 32 proceeds to step S44. If the affirmative determination is made in step S31, the controller 32 proceeds to step S45. Step S44 and step S31 can be switched to each other.

In the flowchart of FIG. 6 of the third embodiment, step S32 of FIG. 5 of the second embodiment can be added between step S49 and step S50. In this case, if the negative determination is made in step S32, the controller 32 proceeds to step S49. If the affirmative determination is made in step S32, the controller 32 proceeds to step S50. Step S49 and step S32 can be switched to each other.

In the flowchart of FIG. 7 of the fourth embodiment, step S31 of FIG. 5 of the second embodiment can be added between step S62 and step S25. In this case, if the negative determination is made in step S62, the controller 32 proceeds to step S31. If the affirmative determination is made in step S31, the controller 32 proceeds to step S25. Step S62 and step S31 can be switched to each other.

In the flowchart of FIG. 7 of the fourth embodiment, step S32 of FIG. 5 of the second embodiment can be added between step S29 and step S30. In this case, if the negative determination is made in step S29, the controller 32 proceeds to step S32. If the affirmative determination is made in step S32, the controller 32 proceeds to step S30. Step S29 and step S32 can be switched to each other.

Step S27 in the flowcharts of FIG. 4 of the first embodiment, FIG. 5 of the second embodiment, FIG. 6 of the third embodiment, and FIG. 7 of the fourth embodiment can be changed to step S62 in the flowchart of FIG. 7 of the fourth embodiment.

Step S27 in the flowcharts of FIG. 4 of the first embodiment and FIG. 7 of the fourth embodiment can be changed to step S62 in the flowchart of FIG. 7 of the fourth embodiment.

Figure 17:
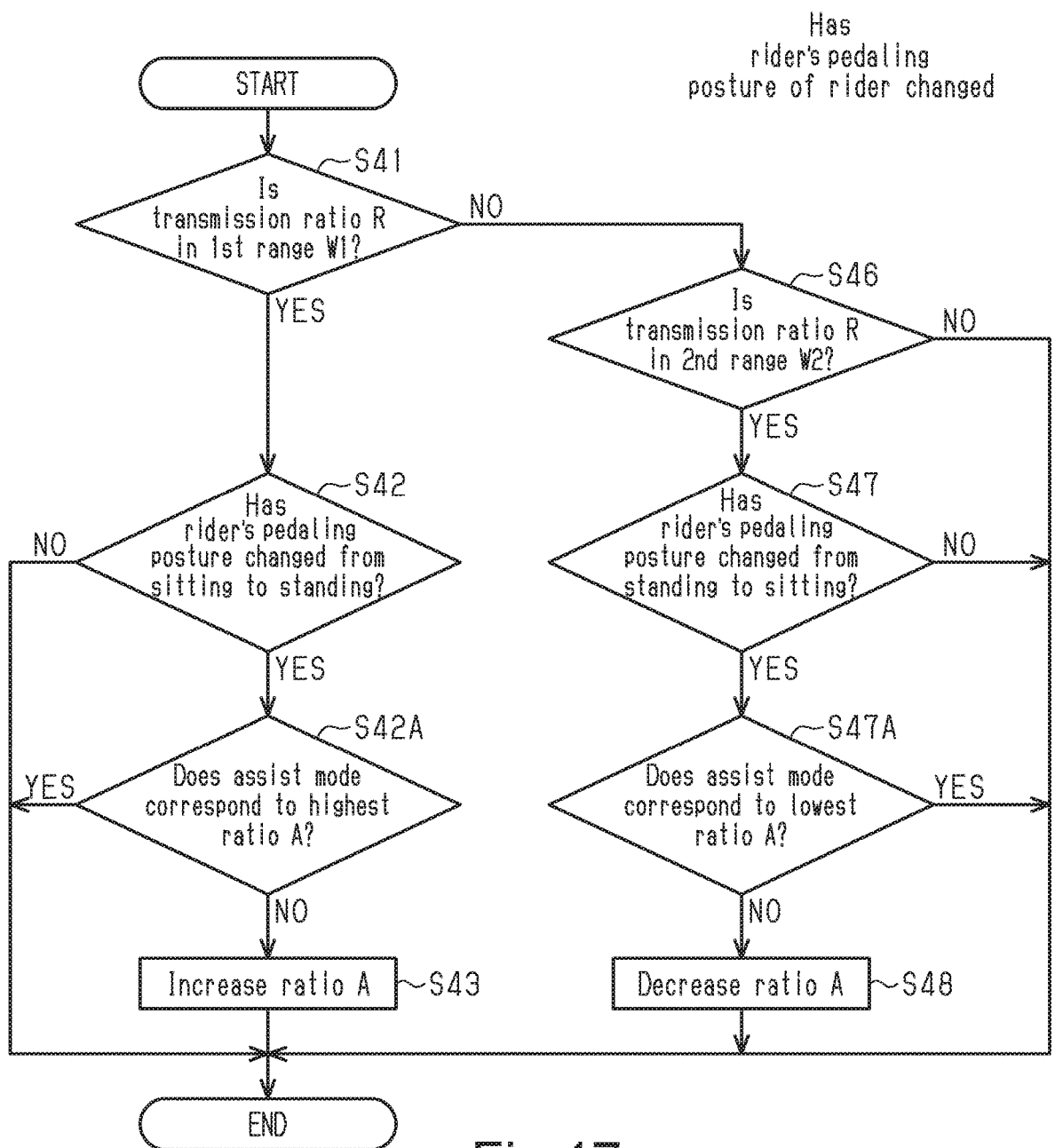
FIG. 17 is a flowchart of a control process for changing the ratio that is executed by a second modification of the electronic controller of the third embodiment.

In the third embodiment and its modifications, as shown in FIG. 17, the controller 32 can execute a control flow obtained by omitting step S44 and step S45 from the flowchart of FIG. 6. As shown in FIG. 17, the controller 32 can execute a control flow obtained by omitting step S49 and step S50 from the flowchart of FIG. 6.

In the first embodiment and its modifications, steps S26, S27, S28, S29, and S30 can be omitted from the flowchart of FIG. 4. In the case of omitting step S26, if the negative determination is made in step S21, the controller 32 ends the process. In the case of omitting steps S26, S27, S28, S29, and S30, the predetermined range W can be configured not to include the second range W2. Additionally, steps S21, S22, S23, S24, and S25 can be omitted from the flowchart of FIG. 4. In the case of omitting step S21, upon determining the operating portion 20 is operated and the assist mode is set, the controller 32 starts the process and proceeds to step S26. In the case of omitting steps S21, S22, S23, S24, and S25, the predetermined range W can be configured not to include the first range W1.

In the second embodiment and its modification, steps S26, S27, S28, S32, and S30 can be omitted from the flowchart of FIG. 5. In the case of omitting steps S26, S27, S28, S32, and S30, the predetermined range W can be configured not to include the second range W2. In the case of omitting step S26, if the negative determination is made in step S21, the controller 32 ends the process. Additionally, in the second embodiment and its modifications, steps S21, S22, S23, S31, and S25 can be omitted from the flowchart of FIG. 5. In the case of omitting step S21, upon determining the operating portion 20 is operated and the assist mode is set, the controller 32 starts the process and proceeds to step S26. In the case of omitting steps S21, S22, S23, S31, and S25, the predetermined range W can be configured not to include the first range W1.

In the third embodiment and its modifications, steps S46, S47, S48, S49, and S50 can be omitted from the flowchart of FIG. 6. In the case of omitting step S46, if the negative determination is made in step S41, the controller 32 ends the process. In the case of omitting steps S46, S47, S48, S49, and S50, the predetermined range W can be configured not to include the second range W2. Additionally, the third embodiment and its modifications, steps S41, S42, S43, S44, and S45 can be omitted from the flowchart of FIG. 6. In the case of omitting step S41, upon determining the operating portion 20 is operated and the assist mode is set, the controller 32 starts the process and proceeds to step S46. In the case of omitting steps S41, S42, S43, S44, and S45, the predetermined range W can be configured not to include the first range W1.

In the fourth embodiment and its modifications, steps S26, S27, S28, S29, and S30 can be omitted from the flowchart of FIG. 7. In the case of omitting step S26, upon determining the negative determination is made in step S21, the controller 32 ends the process. In the case of omitting steps S26, S27, S28, S29, and S30, the predetermined range W can be configured not to include the second range W2. Additionally, steps S21, S61, S23, S62, and S25 can be omitted from the flowchart of FIG. 7. In the case of omitting step S21, upon determining the operating portion 20 is operated and the assist mode is set, the controller 32 starts the process and proceeds to step S26. In the case of omitting steps S21, S61, S23, S62, and S25, the predetermined range W can be configured not to include the first range W1.

In the fifth embodiment and its modifications, steps S74 and S75 can be omitted from FIG. 8. In the case of omitting step S74, if the negative determination is made in step S72, the controller 32 ends the process. Additionally, steps S72 and S73 can be omitted from FIG. 8. In the case of omitting step S72, if the affirmative determination is made in step S71, the controller 32 proceeds to step S74.

In the fifth embodiment and its modifications, the predetermined range W can be configured to include only one of the first range W1 and the second range W2.

What is claimed is:

1. A human-powered vehicle control device comprising:
an electronic controller operatively coupled to a motor that assists in propulsion of a human-powered vehicle, and
the electronic controller being configured to, upon determining a transmission ratio of the human-powered vehicle is in a predetermined range, change at least one of a ratio of an output of the motor to a human driving force that is input to the human-powered vehicle and an upper limit value of an output torque of the motor in accordance with the human driving force inputted to the human-powered vehicle, the transmission ratio being a ratio of a rotational speed of a drive wheel of the human-powered vehicle to a rotational speed of a crank of the human-powered vehicle.

2. The human-powered vehicle control device according to claim 1, wherein the electronic controller is configured to increase the at least one of the ratio and the upper limit value upon determining the transmission ratio is in a first range of the predetermined range and the human driving force is greater than or equal to a first predetermined value.

3. The human-powered vehicle control device according to claim 2, wherein
the electronic controller is configured to decrease the at least one of the ratio and the upper limit value upon determining the transmission ratio has been changed to a value outside the first range after the at least one of the ratio and the upper limit value has been previously increased due to the transmission ratio being in the first range and the human driving force being greater than or equal to the first predetermined value.

4. The human-powered vehicle control device according to claim 2, wherein
the electronic controller is configured to decrease the at least one of the ratio and the upper limit value upon determining the human driving force has been changed to less than the first predetermined value after the at least one of the ratio and the upper limit value has been previously increased due to the transmission ratio being in the first range and the human driving force being greater than or equal to the first predetermined value.

5. The human-powered vehicle control device according to claim 1, wherein
the electronic controller is configured to decrease the at least one of the ratio and the upper limit value upon determining the transmission ratio is in a second range of the predetermined range and the human driving force is less than or equal to a second predetermined value.

6. The human-powered vehicle control device according to claim 5, wherein
the electronic controller is configured to increase the at least one of the ratio and the upper limit value upon determining the transmission ratio has been changed to a value outside the second range after the at least one of the ratio and the upper limit value has been previously decreased due to the transmission ratio being in the second range and the human driving force being less than or equal to the second predetermined value.

7. The human-powered vehicle control device according to claim 5, wherein
the electronic controller is configured to increase the at least one of the ratio and the upper limit value upon determining the human driving force has been changed to greater than the second predetermined value after the at least one of the ratio and the upper limit value is decreased due to the transmission ratio being in the second range and the human driving force being less than or equal to the second predetermined value.

8. The human-powered vehicle control device according to claim 1, wherein
the electronic controller is configured to increase the at least one of the ratio and the upper limit value upon determining the transmission ratio is in a first range of the predetermined range and the human driving force is greater than or equal to a first predetermined value, and
the electronic controller is configured to decrease the at least one of the ratio and the upper limit value upon determining the transmission ratio is in a second range of the predetermined range and the human driving force is less than or equal to a second predetermined value, the transmission ratio of the second range is greater than the transmission ratio of the first range.

9. The human-powered vehicle control device according to claim 1, wherein
the electronic controller is configured to use an input torque that is input to a crank arm of the crank as the human driving force upon determining the crank arm is located at a predetermined rotational angle.

10. The human-powered vehicle control device according to claim 1, wherein
the electronic controller is configured to use an average torque or power that is input to a crank arm of the crank as the human driving force.

11. The human-powered vehicle control device according to claim 1, wherein
the electronic controller is configured to change the transmission ratio in accordance with the human driving force upon determining the transmission ratio is outside the predetermined range.

12. The human-powered vehicle control device according to claim 1, further comprising:
a human driving force detector operatively coupled to the electronic controller.

13. A human-powered vehicle control device comprising:
an electronic controller operatively coupled to a motor that assists in propulsion of a human-powered vehicle, and
the electronic controller being configured to, upon determining a transmission ratio of the human-powered vehicle is in a predetermined range, change at least one of a ratio of an output of the motor to a human driving force that is input to the human-powered vehicle and an upper limit value of an output torque of the motor in accordance with input information that is input from a sensor provided at the human-powered vehicle, the transmission ratio being a ratio of a rotational speed of the drive wheel to the rotational speed of the crank of the human-powered vehicle.

14. The human-powered vehicle control device according to claim 13, wherein
the sensor includes at least one of a crank force sensor, a pedal force sensor, a frame force sensor, a saddle force sensor, a seatpost force sensor, a handlebar force sensor, a vehicle mounted camera, a roll direction inclination sensor, and a roll direction acceleration sensor.

15. The human-powered vehicle control device according to claim 14, wherein
the electronic controller is configured to increase the at least one of the ratio and the upper limit value upon determining a force applied to at least one of the saddle and the seatpost has changed from a value greater than or equal to a third predetermined value to a value less than the third predetermined value.

16. The human-powered vehicle control device according to claim 15, wherein
the electronic controller is configured to decrease the at least one of the ratio and the upper limit value upon determining a force applied to at least one of the saddle and the seatpost has changed from a value less than a fourth predetermined value to a value greater than or equal to the fourth predetermined value.

17. The human-powered vehicle control device according to claim 16, wherein
the third predetermined value differs from the fourth predetermined value.

18. A human-powered vehicle control device comprising:
an electronic controller operatively coupled to a motor that assists in propulsion of a human-powered vehicle, and the electronic controller being configured to, upon determining a transmission ratio of the human-powered vehicle is in a predetermined range, change at least one of a ratio of an output of the motor to a human driving force that is input to the human-powered vehicle and an upper limit value of an output torque of the motor in accordance with a detected pedaling posture of a rider of the human-powered vehicle, the transmission ratio being a ratio of a rotational speed of the drive wheel to the rotational speed of the crank of the human-powered vehicle.

19. The human-powered vehicle control device according to claim 18, wherein
the electronic controller is configured to increase the at least one of the ratio and the upper limit value upon determining the transmission ratio is in a first range of the predetermined range and the detected pedaling posture of the rider has changed from sitting to standing.

20. The human-powered vehicle control device according to claim 18, wherein
the electronic controller is configured to decrease at least one of the ratio and the upper limit value upon determining the transmission ratio is in a second range of the predetermined range and the detected pedaling posture of the rider has changed from standing to sitting.

21. The human-powered vehicle control device according to claim 18, further comprising:
a pedaling posture sensor for detecting the detected pedaling posture of the rider, the pedaling posture sensor operatively coupled to the electronic controller.

* * * * *